(12) United States Patent
Vijayan et al.

(10) Patent No.: US 12,380,303 B2
(45) Date of Patent: Aug. 5, 2025

(54) IMAGE PROCESSING APPARATUS, IMAGE PROCESSING SYSTEM, AND METHOD TO PREVENT DUPLICATE ORDER FOR SUPPLIES

(71) Applicant: BROTHER KOGYO KABUSHIKI KAISHA, Nagoya (JP)

(72) Inventors: Suseendran Vijayan, Nagoya (JP); Yuichiro Sakuragi, Ichinomiya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 105 days.

(21) Appl. No.: 17/479,310

(22) Filed: Sep. 20, 2021

(65) Prior Publication Data

US 2022/0101076 A1 Mar. 31, 2022

(30) Foreign Application Priority Data

Sep. 30, 2020 (JP) .................... 2020-165889
Feb. 26, 2021 (JP) .................... 2021-029409

(51) Int. Cl.
*G06Q 30/0601* (2023.01)
*G03G 15/00* (2006.01)
*G06K 15/00* (2006.01)

(52) U.S. Cl.
CPC ....... *G06K 15/4075* (2013.01); *G03G 15/502* (2013.01); *G03G 15/553* (2013.01); *G06Q 30/0633* (2013.01); *G06Q 30/0641* (2013.01)

(58) Field of Classification Search
CPC ............. G06K 15/4075; G03G 15/502; G03G 15/553; G06Q 30/0633; G06Q 30/0641
(Continued)

(56) References Cited

U.S. PATENT DOCUMENTS 10,810,651 B2 * 10/2020 Ohara ............... G06Q 30/0223
2003/0032421 A1 2/2003 Izumi et al.
(Continued)

FOREIGN PATENT DOCUMENTS

JP 2002244506 A 8/2002
JP 2003050882 A 2/2003
(Continued)

OTHER PUBLICATIONS

"Auto Toner Ordering Support Guide," Mar. 2017, HP Technical White Paper (Year: 2017).*
(Continued)

*Primary Examiner* — Marissa Thein
*Assistant Examiner* — Thomas Joseph Sullivan
(74) *Attorney, Agent, or Firm* — Scully, Scott, Murphy & Presser, P.C.

(57) ABSTRACT

An image processing apparatus includes a printer to perform printing using an expendable supply for at least one of a plurality of different colors, and a controller to, when receiving, via a user interface, an ordering operation to order a particular type of supplies selected on an order screen, place an order for the particular type of supplies to an information processing device via a communication interface, and store history information on the particular type of supplies into a memory, the history information indicating an order history of the particular type of supplies and containing information generated based on a most recent order date of the particular type of supplies, and in response to a display trigger, read out the history information on the particular type of supplies from the memory, and display the read history information on a display such that the particular type of supplies is identified.

17 Claims, 13 Drawing Sheets

(58) Field of Classification Search
USPC .................................................. 705/26.1
See application file for complete search history.

(56) References Cited

U.S. PATENT DOCUMENTS

| | | |
|---|---|---|
| 2011/0209077 A1 | 8/2011 | Matsuura et al. |
| 2012/0176636 A1 | 7/2012 | Ormond |
| 2012/0203632 A1* | 8/2012 | Blum ................ G06Q 30/0255 705/1.1 |
| 2013/0028616 A1* | 1/2013 | Kunihiro ............... G06F 3/1204 399/81 |
| 2015/0262272 A1* | 9/2015 | Matsumoto ........... H04L 63/083 705/26.35 |
| 2015/0346666 A1* | 12/2015 | Tanaka ................ G03G 15/5016 399/24 |
| 2016/0292774 A1 | 10/2016 | Ohara |
| 2017/0064093 A1* | 3/2017 | Shishido .............. G06Q 10/087 |
| 2018/0182021 A1* | 6/2018 | Sugamata ............... H04L 67/10 |
| 2018/0240179 A1* | 8/2018 | Yamamoto ........... B41J 2/17509 |
| 2019/0283439 A1* | 9/2019 | Komine ................... B41J 2/185 |

FOREIGN PATENT DOCUMENTS

| | | |
|---|---|---|
| JP | 2003187123 A | 7/2003 |
| JP | 2008243018 A | 10/2008 |
| JP | 2011168031 A | 9/2011 |
| JP | 2013105097 A | 5/2013 |
| JP | 2016194904 A | 11/2016 |
| JP | 2018-034515 A | 3/2018 |
| JP | 2018190155 A | 11/2018 |

OTHER PUBLICATIONS

"Automatic Supplies Replenishment—ASR," Jan 2018, XEROX (Year: 2018).*

Notice of Reasons for Refusal dated Aug. 20, 2024 received in Japanese Patent Application No. JP 2021-029409.

* cited by examiner

164d

Cyan(C) Last Order

Date:2020/6/26
No. Of Units:2    ←— 164a
Status : Exchanged
Delivery date : 2020/6/25
Replacement date : 2021/6/25

Do you want to continue ordering?

164b — [Yes]    [No] — 164c

Verification

You have remaining(1) units from the last replacement. ← 165a

Do you want to place order for more units?

165b — [Yes]    [No] — 165c

Cyan(C)/Magenta(M)/Yellow(Y)/Black(BK)

IMAGE PROCESSING APPARATUS, IMAGE PROCESSING SYSTEM, AND METHOD TO PREVENT DUPLICATE ORDER FOR SUPPLIES

CROSS-REFERENCE TO RELATED APPLICATION

This application claims priority under 35 U.S.C. § 119 from Japanese Patent Applications No. 2020-165889 filed on Sep. 30, 2020 and No. 2021-029409 filed on Feb. 26, 2021. The entire subject matter of the applications is incorporated herein by reference.

BACKGROUND

Technical Field

Aspects of the present disclosure are related to technologies for ordering supplies from an image processing apparatus.

Related Art

An image forming apparatus has been known that is configured to place an order for expendable supplies therefrom.

SUMMARY

However, the known image forming apparatus does not take into account informing a user of an ordering status regarding supplies that have been ordered. Therefore, there is a risk that the user might place a duplicate order for the supplies without knowing the ordering status regarding the supplies.

Aspects of the present disclosure are advantageous to provide one or more improved techniques to prevent a duplicate order for supplies that have been ordered.

According to aspects of the present disclosure, an image processing apparatus is provided, which includes a printer configured to perform printing using an expendable supply for at least one of a plurality of different colors, a communication interface, a user interface, a display, and a controller. The controller is configured to display, on the display, information on a remaining amount of each of respective supplies corresponding to the plurality of different colors, display a warning screen on the display when the remaining amount of at least one of the respective supplies corresponding to the plurality of different colors is equal to or less than a particular threshold, display, on the display, an order screen configured to accept a selection of supplies to be ordered from among orderable types of supplies including the respective supplies corresponding to the plurality of different colors, when receiving, via the user interface, an ordering operation to order a particular type of supplies selected on the order screen, place an order for the particular type of supplies to an information processing device via the communication interface, and store history information on the particular type of supplies ordered into the memory, the history information indicating an order history of the particular type of supplies ordered and containing information generated based on a most recent order date of the particular type of supplies, and in response to occurrence of a display trigger to display the history information on the particular type of supplies ordered, read out the history information on the particular type of supplies from the memory, and display the read history information on the display in such a manner that the particular type of supplies is identified.

According to aspects of the present disclosure, further provided is an image processing system that includes an image processing apparatus, and an information processing device communicably connected with the image processing apparatus. The image processing apparatus includes a printer configured to perform printing using an expendable supply for at least one of a plurality of different colors, a first communication interface, a user interface, a display, and a first controller. The first controller is configured to display, on the display, information on a remaining amount of each of respective supplies corresponding to the plurality of different colors, display a warning screen on the display when the remaining amount of at least one of the respective supplies corresponding to the plurality of different colors is equal to or less than a particular threshold, display, on the display, an order screen configured to accept a selection of supplies to be ordered from among orderable types of supplies including the respective supplies corresponding to the plurality of different colors, when receiving, via the user interface, an ordering operation to order a particular type of supplies selected on the order screen, place an order for the particular type of supplies to an information processing device via the communication interface, and store history information on the particular type of supplies ordered into the memory, the history information indicating an order history of the particular type of supplies ordered and containing information generated based on a most recent order date of the particular type of supplies, and in response to occurrence of a display trigger to display the history information on the particular type of supplies ordered, read out the history information on the particular type of supplies from the memory, and display the read history information on the display in such a manner that the particular type of supplies is identified. The information processing device includes a second communication interface, and a second controller configured to receive information regarding the particular type of supplies ordered, from the image processing apparatus via the second communication interface.

According to aspects of the present disclosure, further provided is a method implementable on a controller of an image processing apparatus that includes a printer configured to perform printing using an expendable supply for at least one of a plurality of different colors, a communication interface, a user interface, and a display. The method includes displaying, on the display, information on a remaining amount of each of respective supplies corresponding to the plurality of different colors, displaying a warning screen on the display when the remaining amount of at least one of the respective supplies corresponding to the plurality of different colors is equal to or less than a particular threshold, displaying, on the display, an order screen configured to accept a selection of supplies to be ordered from among orderable types of supplies including the respective supplies corresponding to the plurality of different colors, displaying, when receiving, via the user interface, an ordering operation to order a particular type of supplies selected on the order screen, placing an order for the particular type of supplies to an information processing device via the communication interface, and storing history information on the particular type of supplies ordered into the memory, the history information indicating an order history of the particular type of supplies ordered and containing information generated based on a most recent order date of the particular type of supplies, and in response to occurrence of a display trigger to display the history information on the particular type of supplies ordered, reading out the history information on the particular type of supplies from the memory, and displaying the read history information on the display in such a manner that the particular type of supplies is identified.

BRIEF DESCRIPTION OF THE ACCOMPANYING DRAWINGS

FIG. 1A is a block diagram showing a control configuration of an image processing system including an MFP ("MFP" is an abbreviation for "Multi-Function Peripheral") in an illustrative embodiment according to one or more aspects of the present disclosure.

FIG. 1B schematically shows a configuration of a printer of the MFP in the illustrative embodiment according to one or more aspects of the present disclosure.

FIG. 3A shows an example of a supply history information display screen displayed on the display of the MFP in the illustrative embodiment according to one or more aspects of the present disclosure.

FIG. 3B shows an example of an order verification screen displayed on the display of the MFP in the illustrative embodiment according to one or more aspects of the present disclosure.

FIG. 3C shows an example of an order quantity input screen displayed on the display of the MFP in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1A:
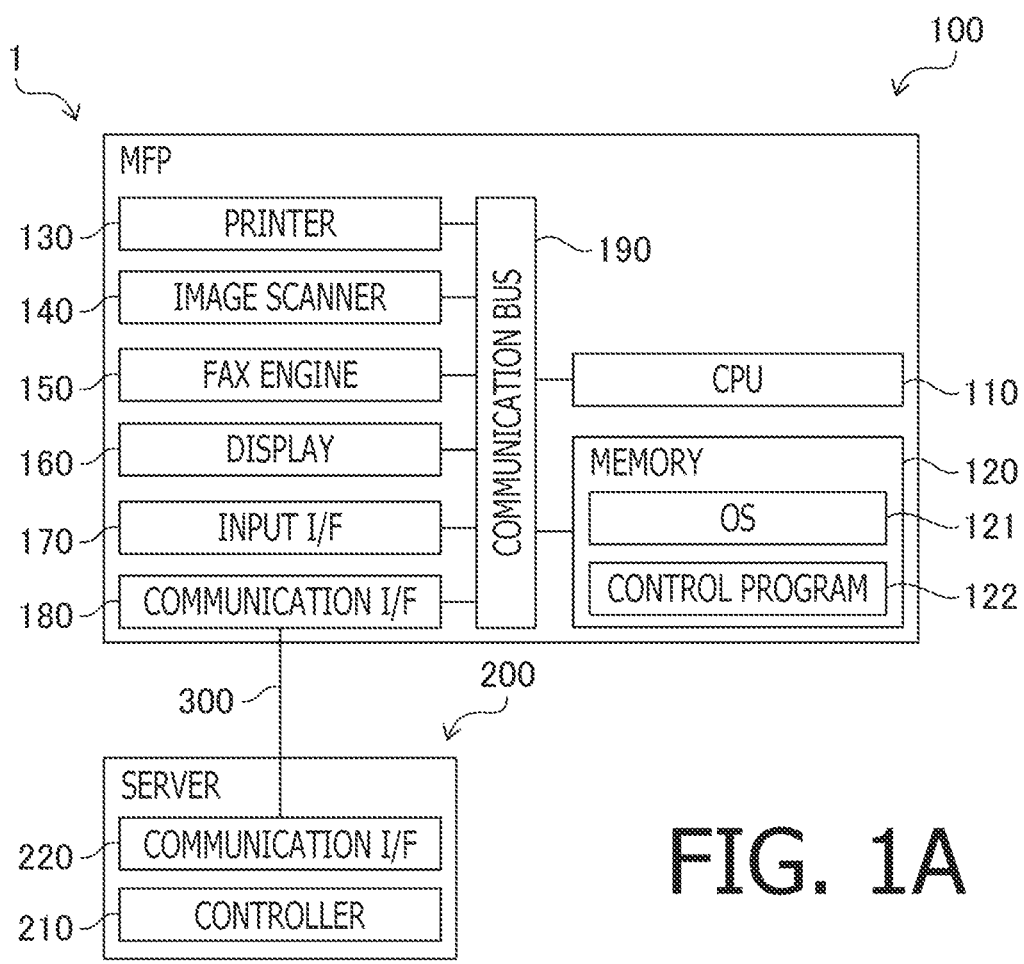

Hereinafter, an illustrative embodiment according to aspects of the present disclosure will be described with reference to the accompanying drawings. FIG. 1A is a block diagram showing a control configuration of an image processing system 1 that includes an MFP ("MFP" is an abbreviation for "Multi-Function Peripheral") 100 of the illustrative embodiment according to aspects of the present disclosure. The image processing system 1 further includes a server 200 as well as the MFP 100.

The MFP 100 and the server 200 are configured to communicate with each other via a communication network 300. Examples of the communication network 300 may include, but are not limited to, the Internet, a wired LAN, a wireless LAN, and a combination of at least two of them. The server 200 includes a controller 210 and a communication I/F ("I/F" is an abbreviation for "interface") 220. The controller 210 is configured to control overall operations of the server 200. The controller 210 may include a CPU and a memory storing programs. The communication I/F 220 is configured to communicate with an external device (e.g., the MFP 100) via the communication network 300.

The MFP 100 includes a printer 130, an image scanner 140, a fax engine 150, a display 160, an input I/F 170, a communication I/F 180, a CPU 110, a memory 120, and a communication bus 190. The elements included in the MFP 100 are communicably interconnected via the communication bus 190.

The printer 130 is configured to perform printing to record on a sheet an image represented by image data. Applicable recording methods for the printer 130 may include known methods such as an inkjet method and an electrophotographic method. The image scanner 140 is configured to perform image scanning to scan an image recorded on a document sheet, thereby generating image data. The fax engine 150 is configured to perform a fax transmitting operation to fax image data to an external device and a fax receiving operation to receive image data from an external device. The MFP 100 has only to include at least one of the printer 130, the image scanner 140, and the fax engine 150.

The input I/F 170 is a user interface to accept input operations by a user. Specifically, the input I/F 170 includes buttons, and is configured to, when one of the buttons is pressed, output an operation signal associated with the pressed button to the CPU 110. Further, the input I/F 170 may have a membranous touch sensor superimposed on a display surface of the display 160. An operation of specifying an object displayed on the display surface of the display 160 and an operation of inputting a character string or a numeric string may be included in examples of user operations. Examples of the "object" may include, but are not limited to, character strings, icons, buttons, links, pull-down menus, displayed on the display 160.

The touch sensor of the input I/F 170 may be configured to output position information indicating a position touched by the user on the display surface. A concept of "touch" in the present disclosure may include overall operations of bringing an input medium into contact with the display surface. The concept of "touch" may further include operations, such as "hover" and "floating touch," to bring the input medium into proximity to the display surface even without bringing the input medium into touch with the display surface. Examples of the input medium may include, but are not limited to, a user's finger and a stylus. A user operation of tapping the position of an icon displayed on the display 160 may be an example of a specifying operation to specify the icon.

The communication I/F 180 is configured to communicate with an external device (e.g., the server 200) via the communication network 300. Namely, the MFP 100 transmits various types of data and information to the server 200 via the communication I/F 180 and receives various types of data and information from the server 200 via the communication I/F 180.

The CPU 110 is configured to control overall operations of the MFP 100. Based on various signals output from the input I/F 170 and various types of information obtained from external device(s) via the communication I/F 180, the CPU 110 obtains various programs from the memory 120 and executes the obtained programs. For instance, the various programs include a control program 122 (see FIG. 1). The control program 122 may be configured to, when executed by the CPU 110, cause the MFP 100 to perform below-mentioned processes (see FIGS. 5 to 10).

The memory 120 stores an OS 121 and the control program 122. The control program 122 may be a single program or an aggregate of a plurality of programs. In addition, the memory 120 stores data and information necessary for the CPU 110 to execute the control program 122. The memory 120 includes at least one of storage devices such as RAMs, ROMs, NVMs ("NVM" is an abbreviation for "Non-Volatile Memory"), EEPROMs, HDDs, portable storage media (e.g., a USB memory detachably attached to the MFP 100), and a buffer of the CPU 110.

The memory 120 may include a non-transitory computer-readable storage medium. Examples of the non-transitory computer-readable storage medium may include, but are not limited to, recording media such as CD-ROMs and DVD-ROMs as well as the aforementioned various storage devices. The non-transitory computer-readable storage medium is also a tangible medium. On the other hand, an electrical signal carrying a program downloaded, e.g., from the server 200 on the Internet, is a computer-readable signal medium, but is not included in the examples of the non-transitory computer-readable storage medium.

The present disclosure will basically show processes that are performed by the CPU 110 according to instructions described in programs. In the following description, processes such as "judging," "extracting," "selecting," "calculating," "determining," "specifying," "identifying," "obtaining," "acquiring," "accepting," "receiving," "controlling," and "setting" may represent processes by the CPU 12. The processes by the CPU 12 may include hardware control via the OS 121. It is noted that "obtaining" or "acquiring" may be used as a concept that does not necessarily require a request. Namely, a process of the CPU 12 receiving data without making a request for the data may be included in a concept of "the CPU 12 obtains (acquires) the data." Further, "data" in the present disclosure may be expressed in a computer-readable bit sequence. Additionally, a plurality of pieces of data having substantially the same meaning or content but expressed in different formats shall be treated as the same data. The same may apply to "information" in the present disclosure. Further, processes such as "commanding (instructing)," "responding," and "requesting" may be performed by communicating information representing "command (instruction)," "response," and "request." Moreover, the terms such as "instruction," "response," and "request" may be used in the sense of information itself representing "instruction," "response," and "request."

Figure 2A:
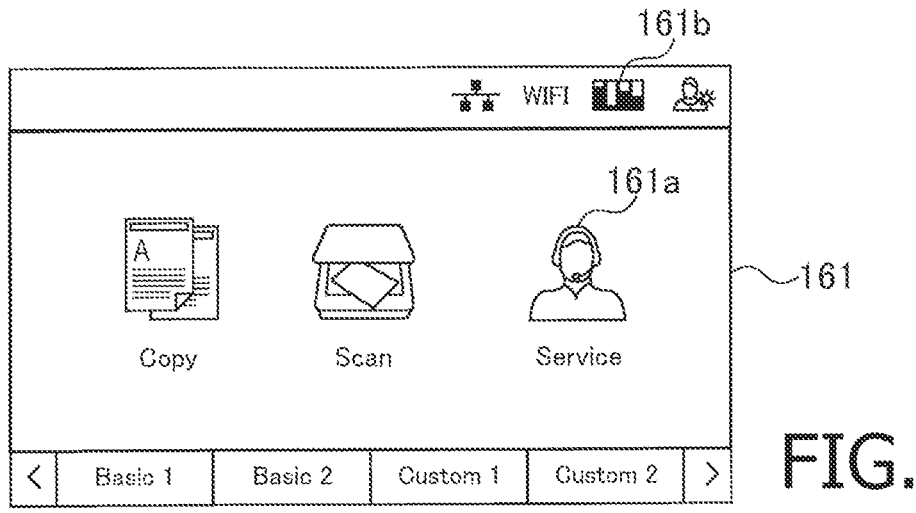
FIG. 2A shows an example of a HOME screen displayed on a display of the MFP in the illustrative embodiment according to one or more aspects of the present disclosure.

In response to a power switch of the MFP 100 being pressed, the CPU 110 starts a main process. In the main process, the CPU 110 first displays a HOME screen 161 on the display 160. FIG. 2A shows an example of the HOME screen 161.

Figure 2B:
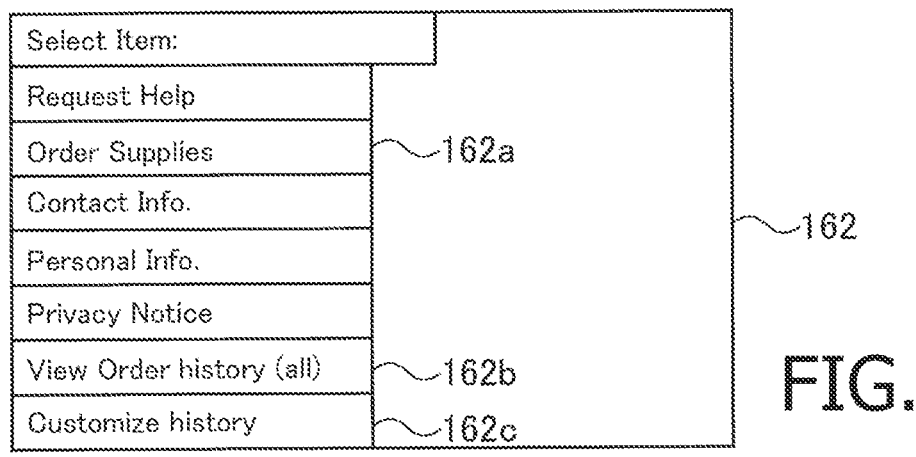
FIG. 2B shows an example of a service screen displayed on the display of the MFP in the illustrative embodiment according to one or more aspects of the present disclosure.

When the "Service" icon 161a in the HOME screen 161 is operated, the CPU displays a service screen 162 on the display 160. FIG. 2B shows an example of the service screen 162. The service screen 162 displays thereon a plurality of selectable items including an "Order Supplies" item 162a, a "View Order history (all)" item 162b, and a "Customize history" item 162c.

Figure 5A:
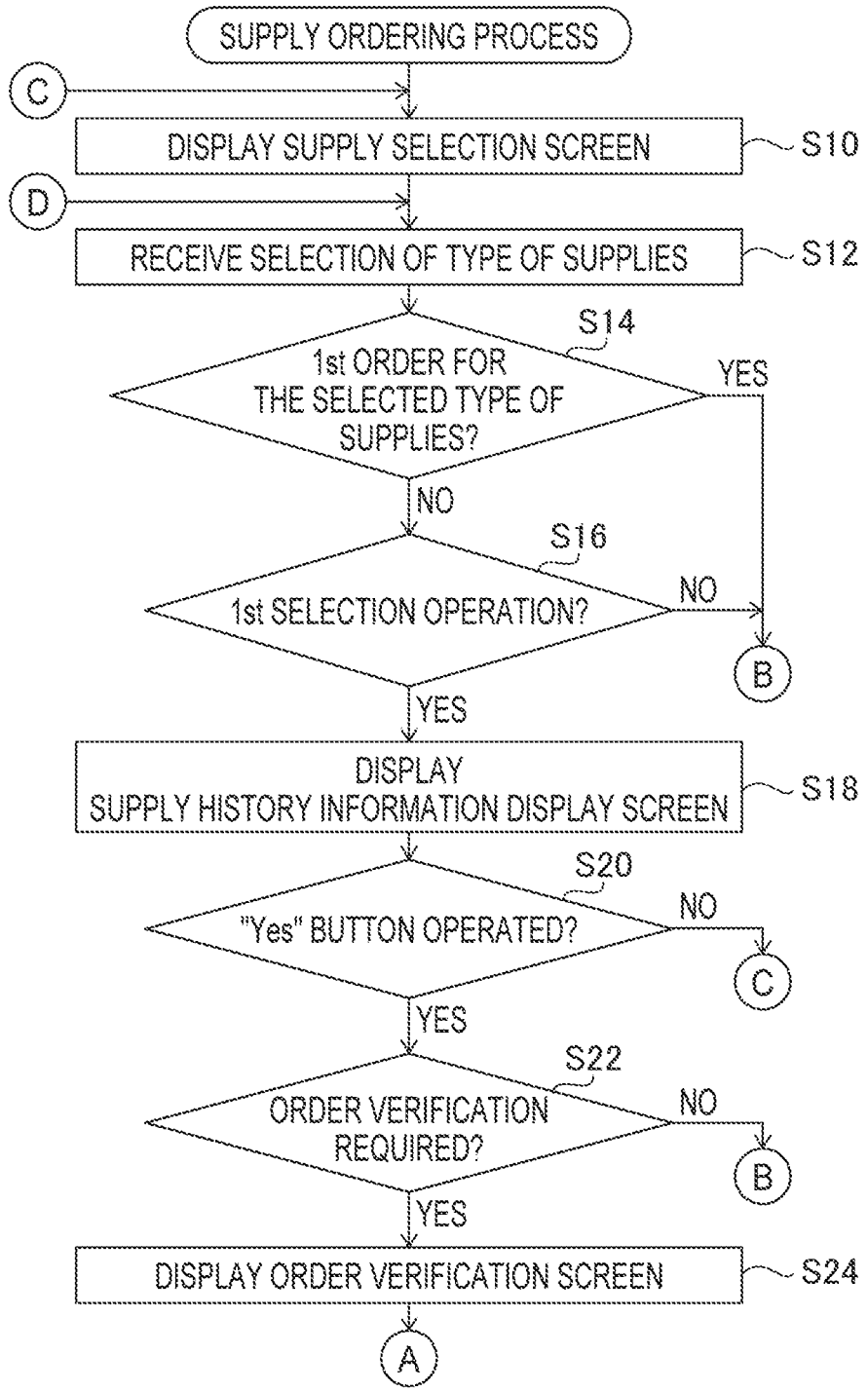
FIGS. 5A and 5B are flowcharts showing a procedure of a supply ordering process to be performed by a CPU of the MFP in the illustrative embodiment according to one or more aspects of the present disclosure.
Figure 5B:
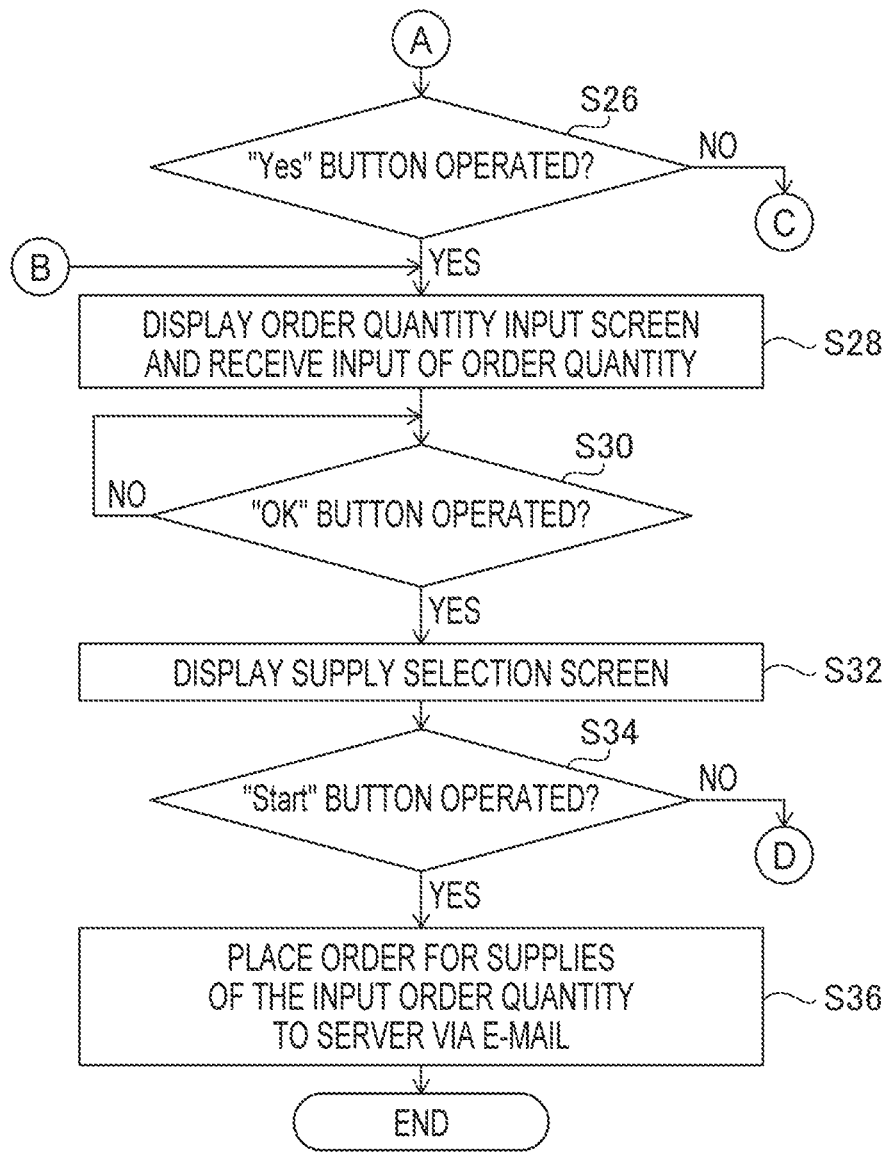

When the "Order Supplies" item 162a is selected on the service screen 162, the CPU 110 performs a supply ordering process (see FIGS. 5A and 5B). When the "Customize history" item 162c is selected, the CPU 110 performs a history display item customization process (see FIG. 6). When the "View Order history (all)" item 162b is selected, the CPU 110 performs a supply history display process (see FIG. 7). When one of the other items is selected, the CPU 110 performs a process corresponding to the selected item. After completion of the process associated with the selected one of the items displayed on the service screen 162, the CPU 110 causes the display 160 to again display the HOME screen 161 (see FIG. 2A).

Figure 10:
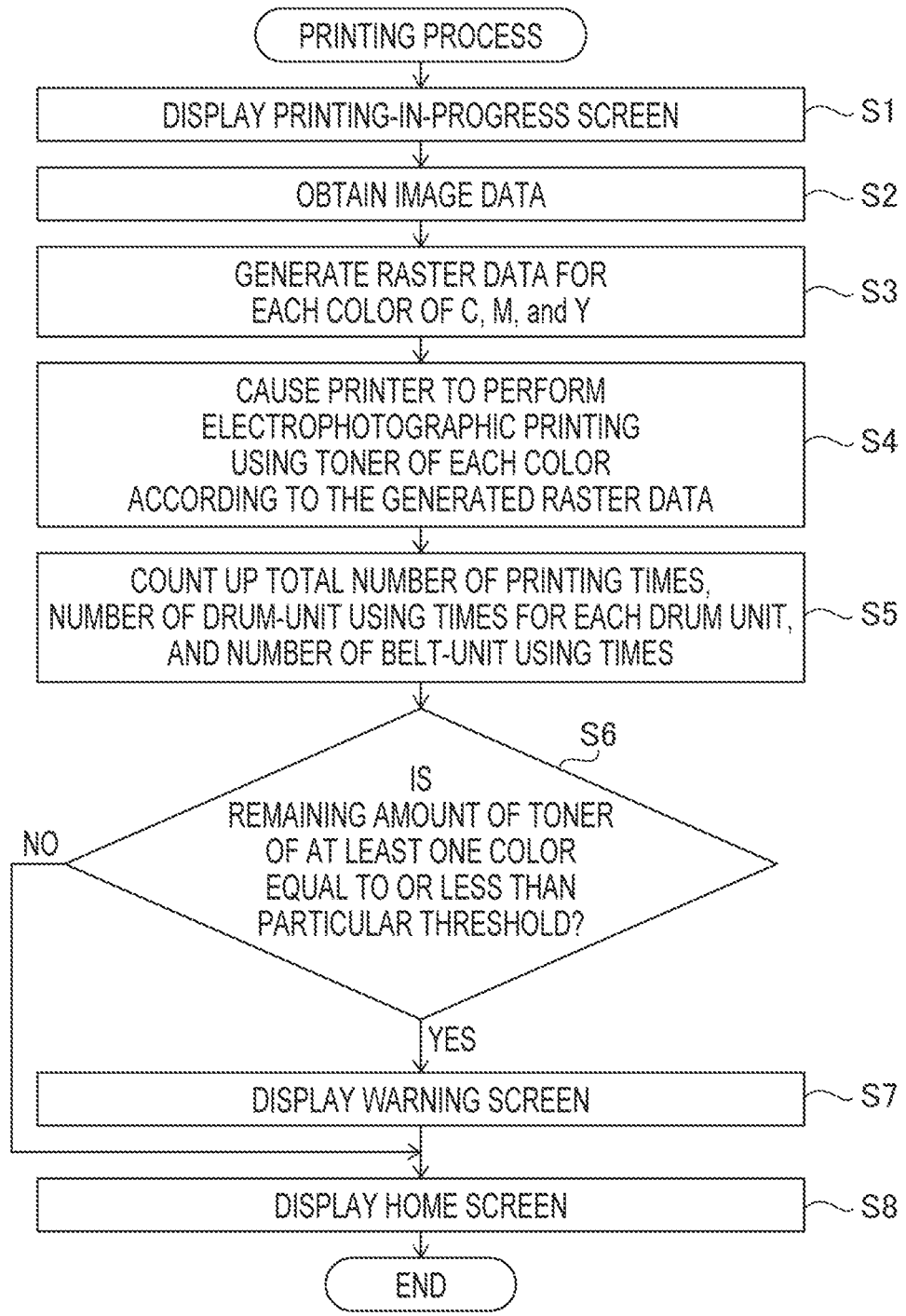
FIG. 10 is a flowchart showing a procedure of a printing process to be performed by the CPU of the MFP in the illustrative embodiment according to one or more aspects of the present disclosure.

In the illustrative embodiment, a color printer configured to record a color image on a sheet in an electrophotographic method is employed as the printer 130. FIG. 10 is a flowchart showing a procedure of a printing process to be performed by the CPU 110 using the printer 130. The printing process is a process included in the aforementioned main process. The printing process is started, for instance, in response to the image scanner 140 sending color image data generated by scanning a color image on a document to the printer 130 when the user provides to the MFP 100 an instruction to scan the color image on the document by the image scanner 140 and print the color image on a sheet by the printer 130. The color image data used in the printing process may be received, for instance, from outside the MFP 100 via the communication I/F 180. In the following description, each of the steps included in each process performed by the CPU 110 will be denoted with "S" added in front of a corresponding numeral.

In the printing process shown in FIG. 10, the CPU 110 first displays a printing-in-progress screen (not shown) on the display 160 (S1). Next, the CPU 110 obtains image data (S2). Then, based on the obtained image data, the CPU 110 generates raster data for each color of C (cyan), M (magenta), and Y (yellow) (S3). At this time, the CPU 110 may generate raster data of BK (black) as well.

Figure 1B:
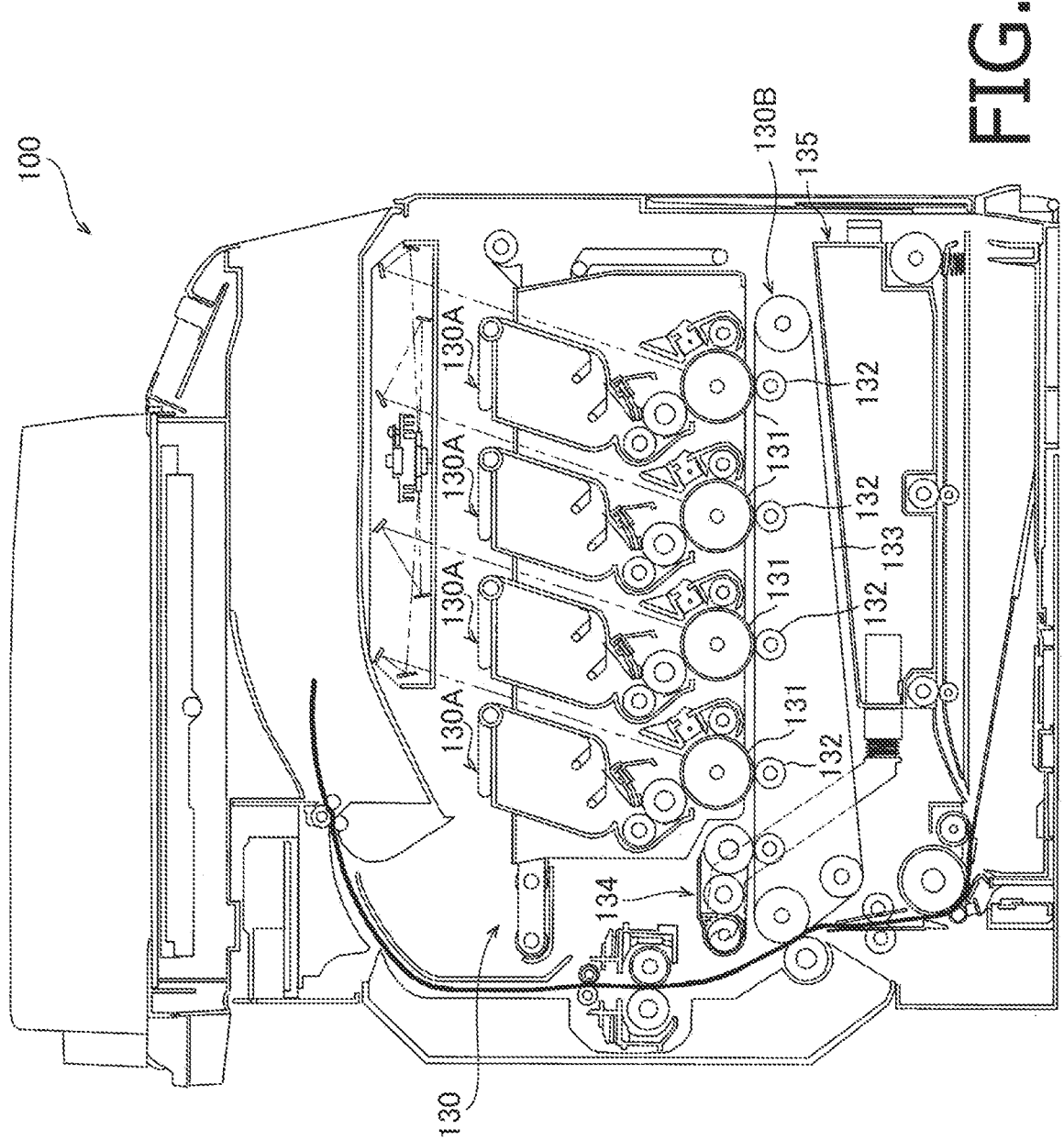

Then, the CPU 110 causes the printer 130 to perform electrophotographic printing on a sheet using toner of each color according to the generated raster data of each color (S4). A specific configuration and operations of the printer 130 to perform the electrophotographic printing have been known. Therefore, only an outline configuration and operations of the printer 130 in the electrophotographic printing will be described here with reference to FIG. 1B. FIG. 1B schematically shows a configuration of the printer 130 included in the MFP 100. As shown in FIG. 1B, the printer 130 includes drum units 130A and a belt unit 130B. Each drum unit 130A includes a photoconductive drum 131 for a corresponding one of the four colors, C, M, Y, and BK. The belt unit 130B includes four transfer rollers 132 and a conveyor belt 133. Each transfer roller 132 is disposed to face a corresponding one of the photoconductive drums 131 across the conveyor belt 133. The printer 130 further includes a cleaner device 134 and a waste toner box 135 that are disposed around the belt unit 130B. In the electrophotographic printing, an electrostatic latent image according to the generated raster data of each color is formed on an outer circumferential surface of the photoconductive drum 131 corresponding to each color. Then, when the toner of each color is supplied to the outer circumferential surface of the corresponding photoconductive drum 131, a developer image of each color is formed and carried on the outer circumferential surface of the corresponding photoconductive drum 131. When a transfer current of negative polarity is applied to the transfer roller 132 corresponding to each color, the developer image carried on the outer circumferential surface of the corresponding photoconductive drum 131 is transferred onto the sheet nipped between the corresponding photoconductive drum 131 and the conveyor belt 133. Thus, the electrophotographic printing is performed on the sheet. Most of adhering substances such as toner and paper dust adhering to the outer circumferential surface of each photoconductive drum 131 are transferred onto the conveyor belt 133. Therefore, removing the adhering substances on the conveyor belt 133 may be substantially regarded as removing the adhering substances on the outer circumferential surface of each photoconductive drum 131. Hence, in the illustrative embodiment, the adhering substances on the conveyor belt 133 are removed by the cleaner device 134 and are collected in the waste toner box 135.

Referring back to FIG. 10, the CPU 110 next counts up a total number of printing times, the number of drum-unit using times for each drum unit 130A, and the number of belt-unit using times that are stored in the memory 120 (S5). The total number of printing times is a total number of printings since factory shipment of the MFP 100. For instance, the number of drum-unit using times is determined for each drum unit 130A as a total number of times that each drum unit 130A has been used since each drum unit 130A was attached. In another instance, the number of drum-unit using times may be a total number of printings since each drum unit 130A was attached. Further, for instance, the number of belt-unit using times is a total number of times that the belt unit 130B has been used since the belt unit 130B was attached. In another instance, the number of belt-unit using times may be a total number of printings since the belt unit 130B was attached. Thus, by counting the number of drum-unit using times and the number of belt-unit using times, it is possible to specify information regarding a drum-unit replacement time at which a drum unit 130A should be replaced with a new one and a belt-unit replacement time at which the belt unit 130B should be replaced with a new one and to display the specified information on the display 160. Examples of display modes to display the specified information may include, but are not limited to, a display mode to display a specific value that is set to be 100% just after each drum unit 130A or the belt unit 130B is attached and to decrease to 90%, 80%, and so on as the number of drum-unit using times or the number of belt-unit using times increases. The examples of the display modes may further include, but are not limited to, a display mode to display an estimated replacement time representing after how many years and months from now each drum unit 130A or the belt unit 130B should be replaced. For instance, to display the information on the drum-unit replacement time and the belt-unit replacement time, the service screen 162 (see FIG. 2B) may include a "Display Supply Replacement Time Information" item. In this case, when the "Display Supply Replacement Time Information" item is selected, the CPU 110 may cause the display 160 to display information on a replacement time when each of expendable supplies including the drum units 130A and the belt unit 130B should be replaced, in one of the aforementioned display modes.

Next, the CPU 110 determines whether or not a remaining amount of toner of at least one of the colors is equal to or less than a particular threshold (S6). The toner of each color is stored in a toner cartridge included in a corresponding one of the drum units 130A. The remaining amount of toner of each color stored in the corresponding toner cartridge may be detected by a sensor or calculated from the number of printing times and the amount of used toner after the corresponding toner cartridge is attached. In S6, the CPU 110 determines whether or not the remaining amount of toner of each color thus obtained is equal to or less than the particular threshold. The remaining amount of toner of each color thus obtained is also used for a toner remaining amount display 161b on the HOME screen 161 (see FIG. 2A). If an ink-jet printer is employed as the printer 130, in S6, the CPU 110 may determine whether or not a remaining amount of ink of at least one of the colors is equal to or less than a particular threshold.

Figure 11:
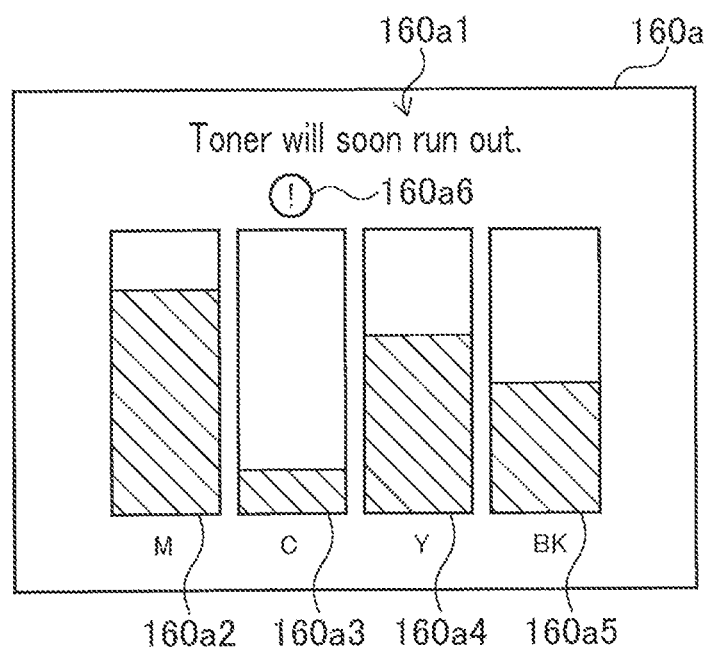
FIG. 11 shows an example of a warning screen displayed on the display of the MFP in the illustrative embodiment according to one or more aspects of the present disclosure.

When determining in S6 that the remaining amount of toner of at least one color is equal to or less than the particular threshold (S6: Yes), the CPU 110 displays a warning screen 160a on the display 160 (S7). Afterward, the CPU 110 goes to S8. FIG. 11 shows an example of the warning screen 160a. The warning screen 160a displays thereon a warning text 160a1 "Toner will soon run out," and bars 160a2 to 160a5 each indicating the remaining amount of toner of a corresponding color. In the example shown in FIG. 11, the warning screen 160a further includes a warning mark 160a6 displayed adjacent to the bar 160a3 for the color (i.e., cyan (C) in the example) of which the toner will soon run out. Meanwhile, when determining in S6 that the remaining amount of toner of every color is more than the particular threshold (S6: No), the CPU 110 skips S7 and proceeds to S8.

In S8, the CPU 110 displays the HOME screen 161 on the display 160. Thereafter, the CPU 110 terminates the printing process. When proceeding from S7 to S8, the CPU 110 may require the user to perform some confirmation operation while the warning screen 160a is displayed, or may display the HOME screen 161 after displaying the warning screen 160a for a particular period of time without making a request for any confirmation operation. When the remaining amount of toner of at least one color is equal to or less than a threshold even lower than the aforementioned particular threshold, the CPU 110 may cause the display 160 to display an error screen before making a transition to the HOME screen 161. Examples of the error screen may include, but are not limited to, a screen on which a warning text "Color printing is not possible due to out of toner" is displayed instead of the warning text 160a1 on the warning screen 160a, and the other displays 160a2 to 160a6 on the warning screen 160a are left as they are.

With respect to the drum units 130A and the belt unit 130B as well, when the information on the replacement time for at least one of the units 130A and 130B is equal to or less than a particular threshold, the CPU 110 may display on the display 160 a warning screen to prompt replacement of the at least one of the units 130A and 130B. Further, when the information on the replacement time for the at least one of the units 130A and 130B is equal to or less than a threshold even lower than the particular threshold, the CPU 110 may display on the display 160 an error screen representing that printing is not possible until the at least one of the units 130A and 130B is replaced.

The aforementioned waste toner box 135 also needs to be replaced when the waste toner box 135 is filled with collected adhering substances. How much more adhering substances are collectable in the waste toner box 135 may be detected by a sensor or calculated from the number of printing times or the amount of used toner after the waste toner box 135 is attached. Therefore, in substantially the same manner as for the drum units 130A and the belt units 130B, the CPU 110 may cause the display 160 to display information on a replacement time for the waste toner box 135 in a display mode to display a specific value that is set to be 100% just after the waste toner box 135 is attached and to decrease to 90%, 80%, and so on as the number of times that the waste toner box 135 is used increases, or in a display mode to display an estimated replacement time representing after how many years and months from now the waste toner box 135 should be replaced. In this case, the information on the replacement time for the waste toner box 135 may also be displayed on the display 160 in one of the aforementioned display modes in response to selection of the "Display Supply Replacement Time Information" item on the service screen 162 (see FIG. 2B). Furthermore, in substantially the same manner as for the drum units 130A and the belt unit 130B, the CPU 110 may cause the display 160 to display a warning screen to prompt replacement of the waste toner box 135 and an error screen representing that printing is not possible until the waste toner box 135 is replaced.

As described above, in the illustrative embodiment, the supply ordering process is performed in response to the selection of the "Order Supplies" item 162a via the service screen 162 (FIG. 2B). However, when a warning screen or an error screen is displayed on the display 160, the CPU 110 may perform the supply ordering process to order supplies that caused the warning screen or the error screen to be displayed. Specifically, for instance, when the warning screen 160a (see FIG. 11) is displayed on the display 160, the CPU 110 may perform the supply ordering process and makes a transition of the screen on the display 160 from the warning screen 160a to a below-mentioned supply selection screen 163 (see FIG. 2C). The CPU 110 may perform substantially the same process for other supplies such as the drum units 130A, the belt unit 130B, and the waste toner box 135.

Figure 2C:
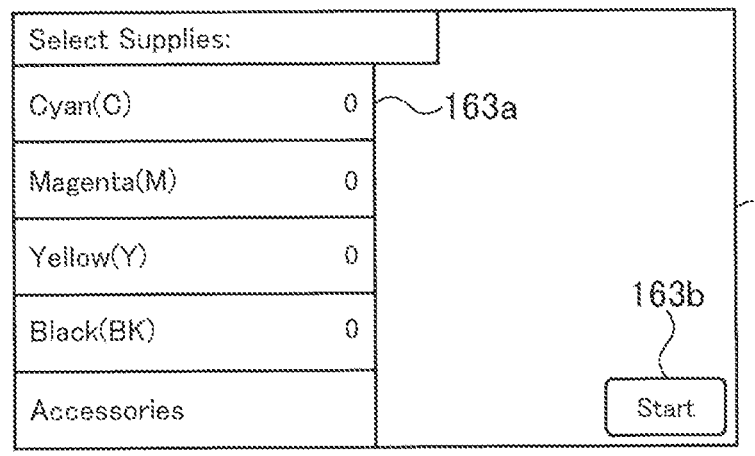
FIG. 2C shows an example of a supply selection screen displayed on the display of the MFP in the illustrative embodiment according to one or more aspects of the present disclosure.

FIGS. 5A and 5B are flowcharts showing a detailed procedure of the supply ordering process. In the supply ordering process shown in FIGS. 5A and 5B, the CPU 110 first displays the supply selection screen 163 on the display 160 (S10). FIG. 2C shows an example of the supply selection screen 163. The supply selection screen 163 displays thereon a list of names of various orderable supplies. A number "0" displayed next to the name of each type of the listed supplies indicates a quantity of each type of the supplies to be ordered. In the example shown in FIG. 2C, "0" is displayed for each type of the supplies listed on the supply selection screen 163. This means that there are no supplies to be ordered.

Next, when receiving a selection of a type of supplies via the supply selection screen 163 (S12), the CPU 110 determines whether the selected type of supplies has not been ordered before and is to be ordered for the first time (S14). When determining that the selected type of supplies is to be ordered for the first time (S14: Yes), the CPU 110 goes to S28. Meanwhile, when determining that the selected type of supplies has been ordered before (S14: No), the CPU 110 determines whether the operation to select the type of supplies is a first selection operation (S16). When determining that the operation to select the type of supplies is not the first selection operation (S16: No), the CPU 110 proceeds to S28. Meanwhile, when determining that the operation to select the type of supplies is the first selection operation (S16: Yes), the CPU 110 displays a supply history information display screen 164 on the display 160 (S18).

FIG. 3A shows an example of the supply history information display screen 164. The supply history information display screen 164 is displayed on the display 160, when the user selects via the supply selection screen 163 a supply name display "Cyan (C)" 163a as a type of supplies to be ordered, if toner of the color "Cyan(C)" has been ordered before (S14: No), and the supply name display "Cyan(C)" 163a is selected for the first time in the currently-performed supply ordering process (S16: Yes). The supply history information display screen 164 displays thereon a history information display 164a, a "Yes" button 164b, and a "No" button 164c. Further, on the supply history information display screen 164, a supply name display 164d is displayed side by side with (more specifically, displayed just above) the history information display 164a in such a manner that the user is allowed to recognize at a glance which type of supplies the history information display 164a is for.

The history information display 164a contains, for instance, an order date on which the supplies were ordered ("Date"), a quantity of remaining supplies ("No. of Units"), a status of the supplies ("Status"), a delivery date on which the supplies were delivered ("Delivery date"), and a replacement date on which the supply was replaced ("Replacement date"). History information for displaying the history information display 164a is stored in the memory 120 for each type of all supplies that have been ordered before. Therefore, when a type of supplies is selected, the CPU 110 reads out the corresponding history information on the selected type of supplies from the memory 120 and uses the read history information for the history information display 164a.

Referring back to FIG. 5A, when the "Yes" button 164b is operated (S20: Yes), the CPU 110 determines whether order verification is required (S22). In S22, the CPU 110 determines whether the order verification is required based on the history information for displaying the history information display 164a. Specifically, for instance, the CPU 110 may determine that the order verification is required when the quantity of remaining supplies of the selected type is equal to or more than "1" even though it has not been long since the last replacement of the supplies or when the status of the supplies represents that the supplies have been ordered and are currently being prepared for delivery. It is noted that the CPU 110 obtains the quantity of remaining supplies in S128 or S134 of a below-mentioned first status obtainment process (see FIG. 8). Likewise, the CPU 110 obtains the status of the supplies in S128 or S134 of the first status obtainment process. The status of the supplies is obtained in a below-mentioned second status obtainment process (see FIG. 9) as well.

When determining in S22 that the order verification is required (S22: Yes), the CPU 110 displays an order verification screen 165 (S24). FIG. 3B shows an example of the order verification screen 165. The order verification screen 165 displays thereon a reason-for-verification display 165a, a "Yes" button 165b, and a "No" button 165c.

Next, when the "Yes" button 165b is operated (S26: Yes), the CPU 110 goes to S28. Meanwhile, when the "No" button 165c is operated (S26: No), the CPU 110 goes back to S10.

In S28, the CPU 110 displays an order quantity input screen 166 on the display 160 and receives an input of an order quantity via the input I/F 170. FIG. 3C shows an example of the order quantity input screen 166. The order quantity input screen 166 includes an order quantity entry field 166a, a numeric keypad 166b, and an OK button 166c. The user may enter an order quantity in the order quantity entry field 166a by operating the numeric keypad 166b.

Next, when the OK button 166c is operated (S30: Yes), the CPU 110 again displays the supply selection screen 163 on the display 160 (S32).

Next, when the "Start" button 163b is operated (S34: Yes), the CPU 110 places an order for the supplies of the input order quantity to the server 200 by e-mail, and store the history information on the supplies ordered into the memory 120 (S36). The stored history information contains the type, the order date, and the quantity of the supplies ordered. It is noted that the CPU 110 reads out, from the memory 120, the history information on the same type of supplies as ordered and displays the read history information on the display 160, in response to occurrence of a display trigger to display the history information on the same type of supplies as ordered. For instance, as described above, when receiving, via the supply selection screen 163 (see FIG. 2C), a selection operation (i.e., an example of the display trigger) to select the same type of supplies as ordered in S36 of the earlier-executed supply ordering process (S12), the CPU 110 reads out the history information on the selected type of supplies from the memory 120 and displays the read history information on the display 160 (S18). In another instance, when receiving a selection operation (i.e., another example of the display trigger) to select the "View Order history (all)" item 162b on the service screen 162 (see FIG. 2B), the CPU 110 performs the supply history display process (see FIG. 7), thereby displaying the history information on each type of all the supplies that have been ordered before, on a below-mentioned all-order-history display screen 169 (see FIG. 4B). After S36, the CPU 110 terminates the supply ordering process. Thus, the CPU 110 does not provide a supply ordering instruction unless the supply selection screen 163 is operated in a state where a valid order quantity (i.e., an order quantity equal to or more than "1") is input for at least one of the orderable types of supplies displayed thereon. In other words, the CPU 110 does not provide a supply ordering instruction as long as a valid order quantity (e.g., "1") is not displayed for at least one of the orderable types of supplies on the supply selection screen 163.

Meanwhile, when a type of supplies is selected (S34: No), the CPU 110 goes back to S12.

Thus, in the supply ordering process, when a type of supplies is selected via the supply selection screen 163, the CPU 110 does not immediately make a transition of the screen on the display 160 from the supply selection screen 163 to the order quantity input screen 166, but makes a transition to the order quantity input screen 166 through the supply history information display screen 164 and, if necessary, the order verification screen 165. Thereby, it is possible to prevent a duplicate order for the supplies.

On the other hand, when determining that the selected type of supplies is to be ordered for the first time (S14: Yes), the CPU 110 makes a transition of the screen on the display 160 from the supply selection screen 163 to the order quantity input screen 166, not through the supply history information display screen 164. This is because there is no history information stored in the memory 120 to display the history information display 164a on the supply history information display screen 164.

Further, when the operation to select the type of supplies is not the first selection operation (S16: No) as well, the CPU 110 makes a transition of the screen on the display 160 from the supply selection screen 163 to the order quantity input screen 166, not through the supply history information display screen 164. A reason for this is provided below. Examples of the case where the operation to select the type of supplies is not the first selection operation may include, but are not limited to, a case where the CPU 110 makes a transition of the screen on the display 160 from the supply selection screen 163 to the order verification screen 165 through the supply history information display screen 164, and again makes a transition to the supply selection screen 163 in response to the "No" button 165c being operated on the order verification screen 165, and then the supply name display "Cyan (C)" 163a is selected again on the supply selection screen 163. In this case, if the supply history information display screen 164 is displayed again, it will cause the user to see the supply history information display screen 164 again even though the user has already seen it. Such a screen transition in this case may be inconsistent with the user's intention.

In the supply ordering process of the illustrative embodiment, the CPU 110 makes a transition of the screen on the display 160 from the supply selection screen 163 to the order quantity input screen 166, not through the supply history information display screen 164, when the selected type of supplies is to be ordered for the first time (S14: Yes), or when the operation to select the type of supplies is not the first selection operation (S16: No) even though the selected type of supplies is not to be ordered for the first time (S14: No). However, it may be switched by a user setting whether to make the screen transition through or not through the supply history information display screen 164. For instance, when a user setting to "make the screen transition not through the supply history information display screen 164" is configured, in any case, the CPU 110 may make a direct transition from the supply selection screen 163 to the order quantity input screen 166.

Figure 4A:
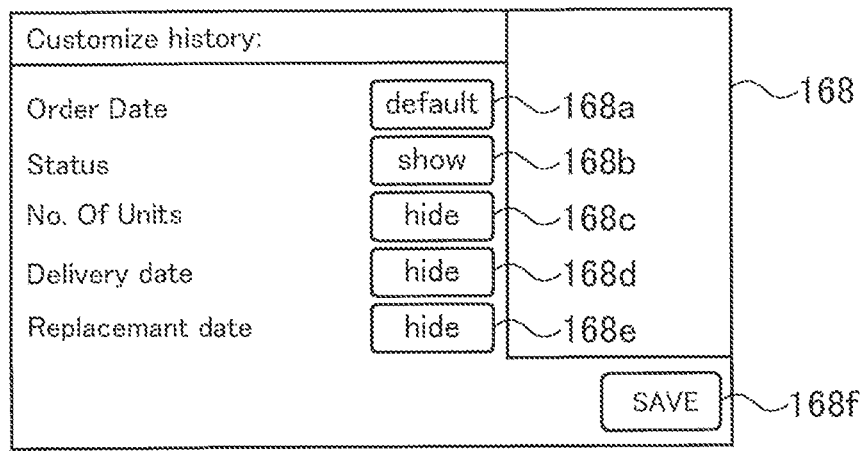
FIG. 4A shows an example of a history display item customization screen displayed on the display of the MFP in the illustrative embodiment according to one or more aspects of the present disclosure.
Figure 6:
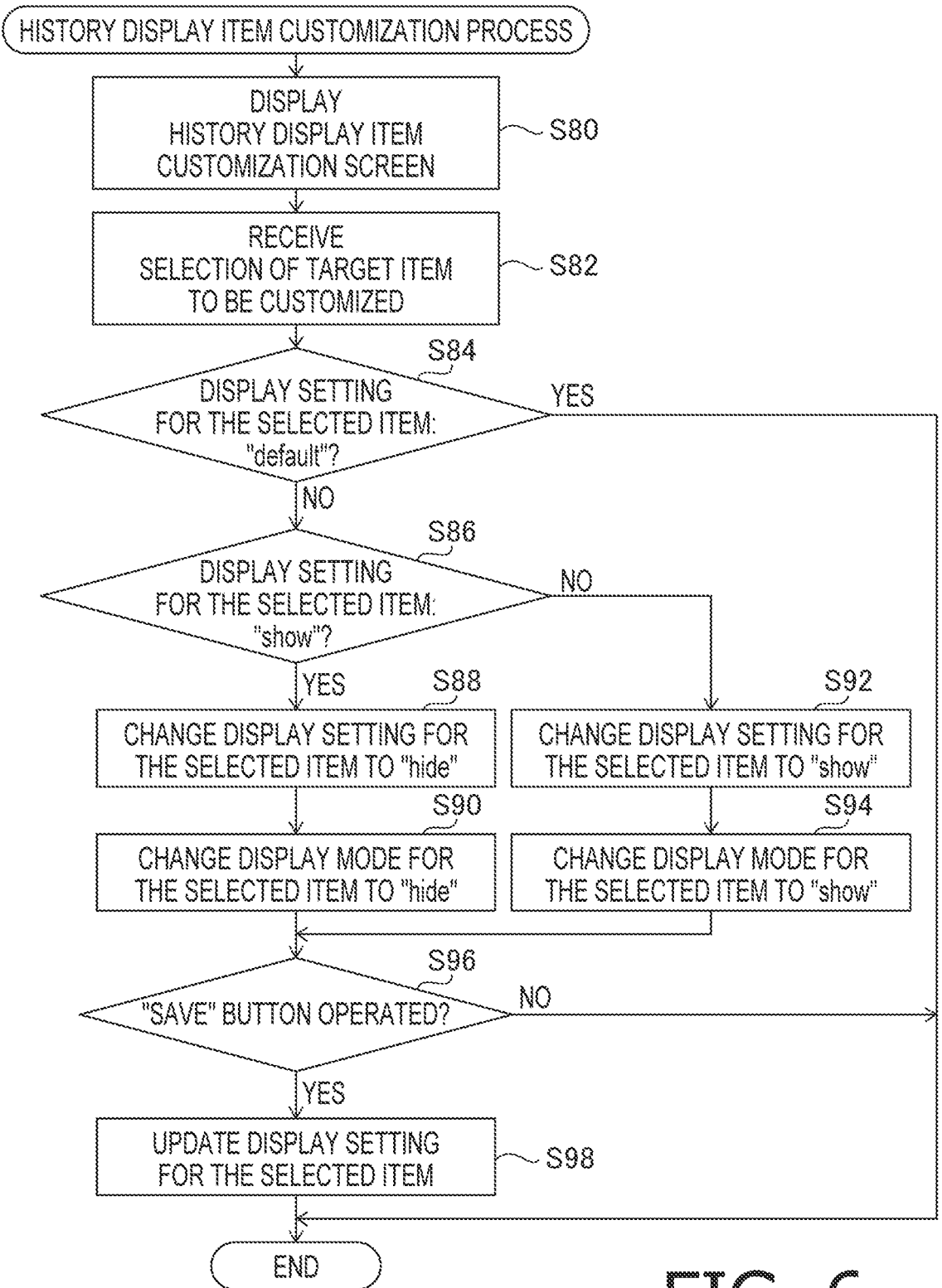
FIG. 6 is a flowchart showing a procedure of a history display item customization process to be performed by the CPU of the MFP in the illustrative embodiment according to one or more aspects of the present disclosure.

FIG. 6 is a flowchart showing a detailed procedure of the history display item customization process. In the history display item customization process shown in FIG. 6, the CPU 110 first displays a history display item customization screen 168 on the display 160 (S80). FIG. 4A shows an example of the history display item customization screen 168. The history display item customization screen 168 is a screen for customizing whether to display each item contained in individual history information on all the supplies ordered before that is to be displayed on the below-mentioned all-order-history display screen 169 (see FIG. 4B). The history display item customization screen 168 includes buttons 168a to 168e for switching whether to display respective corresponding items, and a "SAVE" button 168f. Since the items shown on the history display item customization screen 168 are the same as those in the history information display 164a (see FIG. 3A), explanations thereof will be omitted. However, it is noted that even an item that is switched to a "hide" setting via the history display item customization screen 168 is shown in the history information display 164a. Namely, all the items are displayed in the history information display 164a. A reason for this is provided below. On the all-order-history display screen 169, when the number of supplies that have been ordered in the past is large, the number of individual history records in the history of all orders for supplies to be displayed becomes large. Therefore, there are many user requests to shorten the history of all orders for supplies to be displayed. Meanwhile, the history information display 164a only shows an order history for one type of supplies. Hence, there are few user requests to shorten the order history to be displayed. The "SAVE" button 168f is for saving display settings after customization. It is noted that in substantially the same manner as the all-order-history display screen 169, the history information display 164a may hide the item for which the display setting is switched to the "hide" setting via the history display item customization screen 168.

Referring back to FIG. 6, when receiving a selection of a target item to be customized (S82), the CPU determines whether a display setting for the selected item is a "default" setting (S84). In the illustrative embodiment, there are three display settings "default," "show," and "hide" as show/hide switchable settings for each item. The "default" setting fixedly represents "show" by default. In other words, an item with the "default" setting configured is unable to be switched to the "hide" setting.

When determining in S84 that the display setting for the selected item is the "default" setting (S84: Yes), the CPU 110 terminates the history display item customization process. On the other hand, when determining that the display setting for the selected item is not the "default" setting (S84: No), but is the "show" setting (S86: Yes), the CPU 110 changes the "show" setting to the "hide" setting (S88) and changes a display mode for the selected item on the display 160 from a "show" mode to a "hide" mode (S90). Thereafter, the CPU 110 goes to S96.

Meanwhile, when determining in S86 that the display setting for the selected item is the "hide" setting (S86: No), the CPU 110 changes the "hide" setting to the "show" setting (S92) and changes the display mode for the selected item on the display 160 from the "hide" mode to the "show" mode (S94). Thereafter, the CPU 110 goes to S96.

In S96, when the "SAVE" button 168f is operated (S96: Yes), the CPU 110 saves the changed display setting, thereby updating the display setting for the selected item (S98). Afterward, the CPU 110 terminates the history display item customization process. On the other hand, when the "SAVE" button 168f is not operated, and an operation to make a transition from the history display item customization screen 168 to another screen is performed (S96: No), the CPU 110 terminates the history display item customization process without executing S98. In this case, the display setting changed in S88 or S92 is restored to the state before the display setting was changed.

In the illustrative embodiment, the "default" setting fixedly represents "show" by default. However, the "default" setting may fixedly represent "hide" by default. Further, in the illustrative embodiment, the "default" setting is unable to be changed to any other display setting. However, the "default" setting may be changed to "hide" or "show." Further, the "default" setting may be eliminated. In this case, the two display settings other than the "default" setting, i.e., the "show" setting and the "hide" setting may be adopted as the show/hide switching settings.

Figure 7:
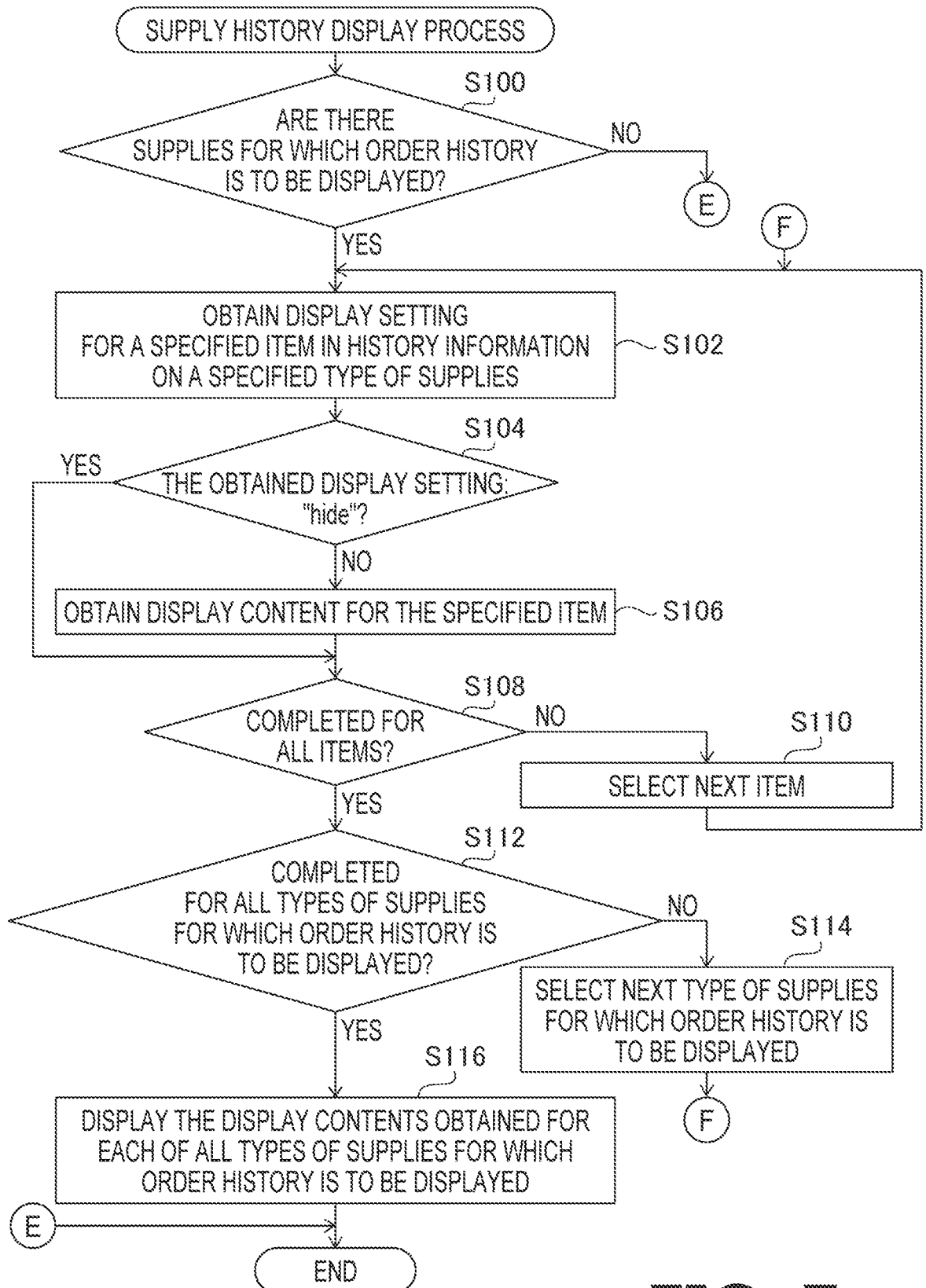
FIG. 7 is a flowchart showing a procedure of a supply history display process to be performed by the CPU of the MFP in the illustrative embodiment according to one or more aspects of the present disclosure.

FIG. 7 is a flowchart showing a detailed procedure of the supply history display process. In the supply history display process shown in FIG. 7, the CPU 110 first determines whether there are supplies for which an order history is to be displayed (S100). As described above, the history information on supplies that have been ordered in the past is stored in the memory 120 in order to display the history information display 164a. Therefore, in S100, the CPU 110 determines whether there are supplies for which the order history is to be displayed, by determining whether the corresponding history information is stored in the memory 120. When determining that there are no supplies for which the order history is to be displayed (S100: No), the CPU 110 terminates the supply history display process. Meanwhile, when determining that there are supplies for which the order history is to be displayed (S100: Yes), the CPU 110 first specifies one type of supplies for which the order history is to be displayed, then specifies one item from among the plurality of items included in the history information on the specified type of supplies, and obtains the display setting for the specified item from the memory 120 (S102).

Next, when the obtained display setting is not the "hide" setting (S104: No), that is, the obtained display setting is the "default" setting or the "show" setting, the CPU 110 obtains a display content for the specified item (S106). Thereafter, the CPU 110 proceeds to S108. Meanwhile, when the obtained display setting is the "hide" setting (S104: Yes), the CPU 110 skips S106 and proceeds to S108.

Figure 4B:
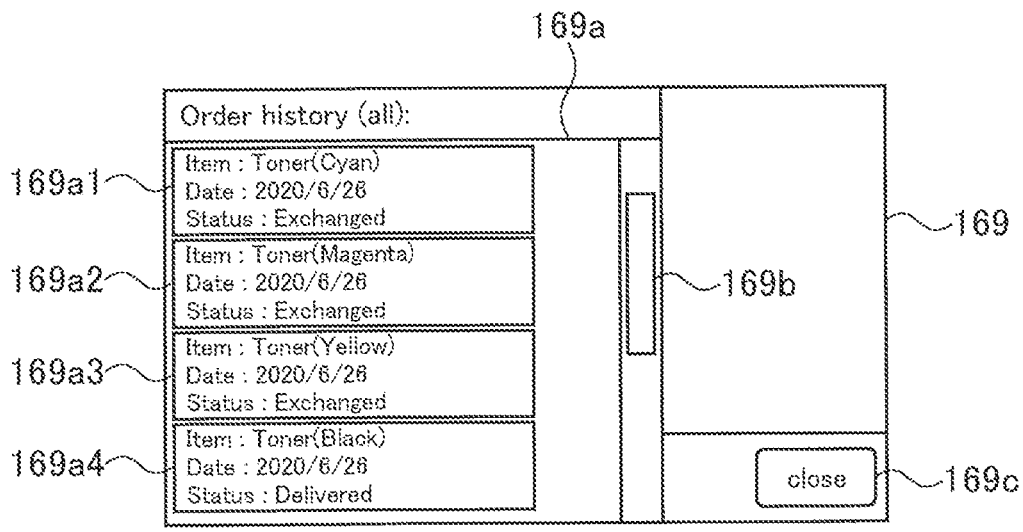
FIG. 4B shows an example of an all-order-history display screen displayed on the display of the MFP in the illustrative embodiment according to one or more aspects of the present disclosure.

FIG. 4B shows an example of the all-order-history display screen 169 displayed on the display 160 by the supply history display process. The all-order-history display screen 169 includes an all-order-history display area 169a, a scroll bar 169b, and a "close" button 169c. The all-order-history display area 169a is configured to display individual history information (e.g., 169a1, 169a2, 169a3, and 169a4) for each type of all the supplies that have been ordered in the past. The scroll bar 169b is configured to, when operated, scroll the history information on supplies displayed in the all-order-history display area 169a, thereby causing the history information on supplies not displayed in the all-order-history display area 169a to appear in the all-order-history display area 169a. The "close" button 169c is configured to, when operated, close the all-order-history display screen 169 and make a transition to another screen.

Each of the items to be displayed in the history information (e.g., 169a1, 169a2, 169a3, and 169a4) is an item for which the display setting is set to "default" or "show," as described above. In other words, any items for which the display setting is the "hide" setting are not displayed. In S104, the CPU 110 makes a determination not to obtain the display contents of the items for which the display setting is the "hide" setting.

Referring back to FIG. 7, in S108, the CPU 110 determines whether the processes of S104 and S106 have been completed for all the items included in the history information on the specified type of supplies. When determining that at least one item still remains for which the processes of S104 and S106 are to be performed (S108: No), the CPU 110 selects a next item (S110), and then goes back to S102. Meanwhile, when determining that there are no items remaining for which the processes of S104 and S106 are to be performed (S108: Yes), the CPU 110 determines whether the processes of S102 to S110 have been completed for all types of supplies for which the order history is to be displayed (S112). When determining that at least one type of supplies still remains for which the processes of S102 to S110 are to be performed (S112: No), the CPU 110 selects a next type of supplies for which the order history is to be displayed (S114), and then goes back to S102.

On the other hand, when determining in S112 that there are no supplies remaining for which the processes of S102 to S110 are to be performed (S112: Yes), the CPU 110 displays the display contents obtained for each of all types of supplies for which the order history is to be displayed (S116). Thereby, as shown in FIG. 4B, a plurality of pieces of history information (e.g., 169a1, 169a2, 169a3, and 169a4) are displayed in the all-order-history display area 169a on the all-order-history display screen 169. Then, when the "close" button 169c is operated, the CPU 110 terminates the supply history display process.

Figure 8:
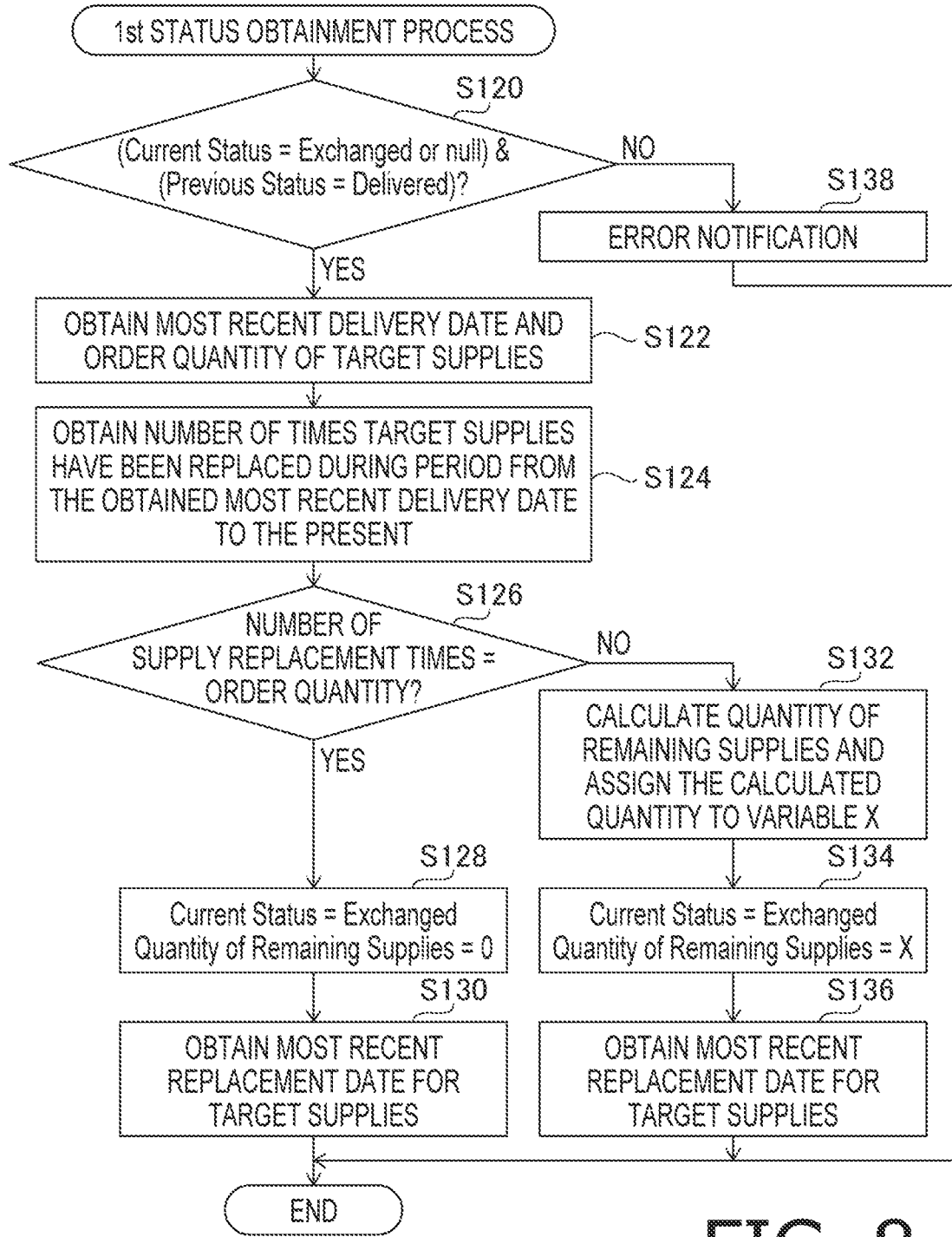
FIG. 8 is a flowchart showing a procedure of a first status obtainment process to be performed by the CPU of the MFP in the illustrative embodiment according to one or more aspects of the present disclosure.

FIG. 8 is a flowchart showing a procedure of the first status obtainment process. For each type of supplies ordered in S36 of the supply ordering process (see FIGS. 5A and 5B), the first status obtainment process is performed periodically after placement of the order.

In the first status obtainment process shown in FIG. 8, the CPU 110 first determines whether status requirements "(Current Status=Exchanged or null) & (Previous Status=Delivered)" are satisfied (S120). In the illustrative embodiment, possible statuses of each type of supplies include six statuses, i.e., "null," "Exchanged," "Sent," "Received," "Dispatched," and "Delivered." The status "null" indicates that a corresponding supply has not been replaced. The status "Exchanged" indicates that the supply has been replaced. The status "Sent" indicates that an order e-mail for ordering the supplies has been sent to the server 200. The status "Received" indicates that the server 200 has received the order e-mail. The status "Dispatched" indicates that the ordered supplies have been dispatched. The status "Delivered" indicates that delivery of the ordered supplies has been completed. Which status the Current Status of a target type of supplies to be processed is of the four statuses "Sent," "Received," "Dispatched," and "Delivered" is obtained in the below-mentioned second status obtainment process (see FIG. 9). It is noted that hereinafter, the target type of supplies to be processed may be simply and situationally referred to as "the target supplies" or "the target supply."

In S120, a status requirement (Current Status=Exchanged or null) represents that the Current Status of the target type of supplies to be processed is either the status "Exchanged" in which the target supply has been replaced and the status "null" in which the target supply has not been replaced. Further, another status requirement (Previous Status=Delivered) represents that the Previous Status of the target supplies is the status "Delivered" in which delivery of the target supplies has been completed. Then, in S120, it is determined whether both of the status requirements (Current Status=Exchanged or null) and (Previous Status=Delivered) are "true." In other words, when it is determined that both of the status requirements are "true" (S120: Yes), the target type of supplies to be processed is in a status where delivery of the target supplies has been completed, and currently, the target supply has been replaced or has not yet been replaced. In this case, the CPU 110 goes to S122. Meanwhile, when at least one of the status requirements is "false" (S120: No), the CPU 110 provides an error notification (S138). Thereafter, the CPU 110 terminates the first status obtainment process.

In S122, the CPU 110 obtains the most recent delivery date and the order quantity of the target type of supplies to be processed. For instance, the most recent delivery date may be obtained by analyzing an e-mail with "Delivered" described therein that has been received most recently regarding the target supplies. The order quantity of the target supplies is also usually described in this e-mail. Therefore, the order quantity may be obtained from the e-mail.

Next, the CPU 110 obtains the number of times the target supplies have been replaced during a period of time from the obtained most recent delivery date to the present (S124). Hereinafter, the number of times the target supplies have been replaced during the period of time from the obtained most recent delivery date to the present may be simply referred to as the "number of supply replacement times." When a supply is replaced with a new one, a replacement date of the supply is stored into the memory 120. Therefore, the CPU 110 may obtain the number of supply replacement times by counting the replacement dates for the target supplies within the period of time between the most recent delivery date of the target supplies and the current date.

Next, the CPU 110 determines whether the number of supply replacement times is equal to the order quantity (S126). When determining that the number of supply replacement times is equal to the order quantity (S126: Yes), the CPU 110 sets the Current Status=Exchanged, and sets the quantity of remaining supplies=0 (S128). Further, the CPU 110 obtains the most recent replacement date of the target supplies (S130). Thereafter, the CPU 110 terminates the first status obtainment process.

On the other hand, when determining in S126 that the number of supply replacement times is not equal to the order quantity (S126: No), the CPU 110 calculates the quantity of remaining supplies and assigns the calculated quantity to a variable x (S132).

Next, the CPU 110 sets the Current Status=Exchanged, and sets the quantity of remaining supplies=x (S134). Further, the CPU 110 obtains the most recent replacement date of the target supplies (S136). Thereafter, the CPU 110 terminates the first status obtainment process.

Thus, the CPU 110 obtains the Current Status, the quantity of remaining supplies, and the most recent replacement date in the first status obtainment process, and updates the Current Status, the quantity of remaining supplies, and the most recent replacement date in the history information on the target supplies by overwriting them with the obtained ones.

Figure 9:
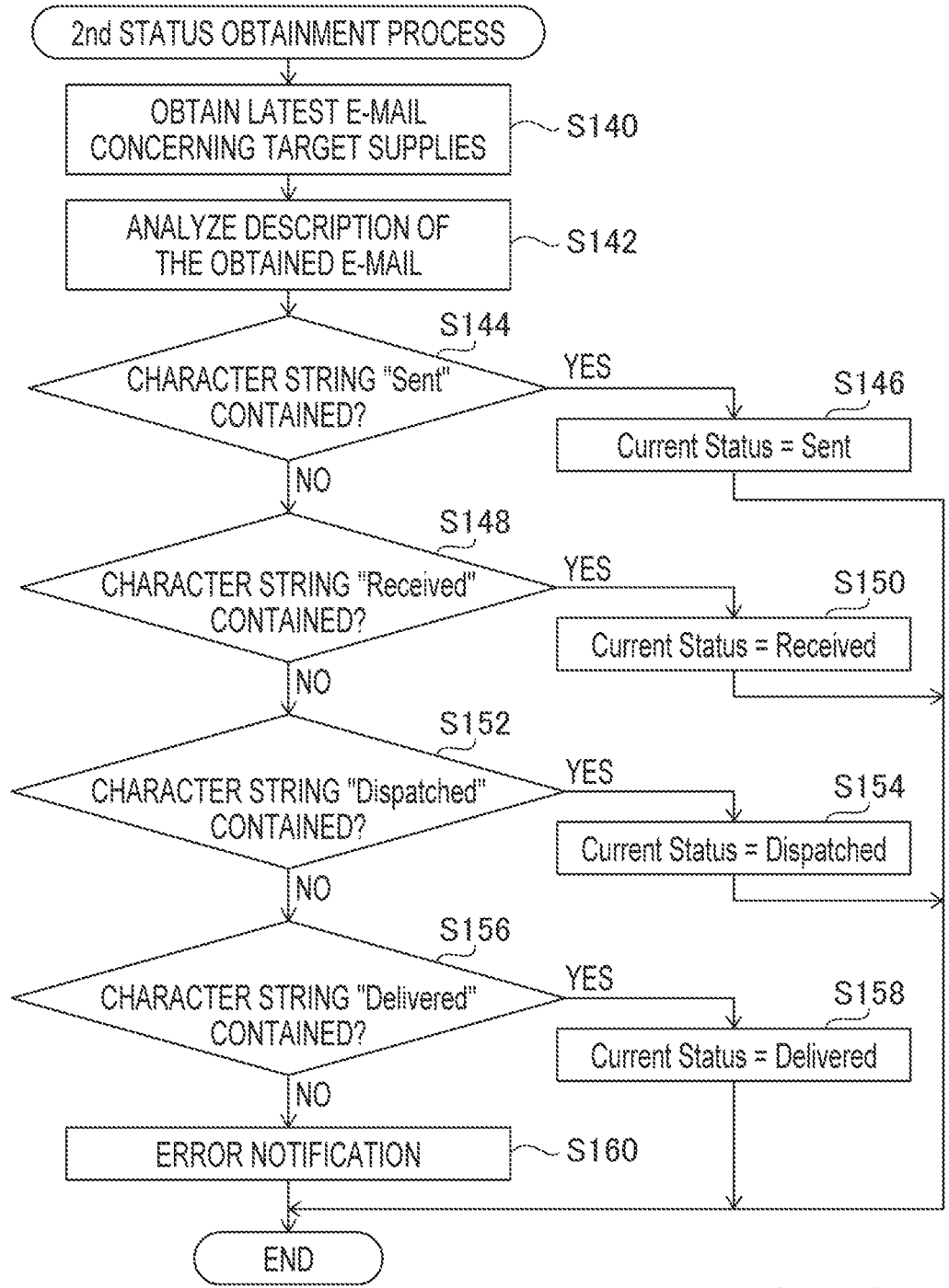
FIG. 9 is a flowchart showing a procedure of a second status obtainment process to be performed by the CPU of the MFP in the illustrative embodiment according to one or more aspects of the present disclosure.

FIG. 9 is a flowchart showing a procedure of the second status obtainment process. The second status obtainment process is performed periodically for the supplies ordered by e-mail in S36 of the supply ordering process (FIGS. 5A and 5B), until an e-mail with "Delivered" described therein is received after the placement of the order.

In the second status obtainment process shown in FIG. 9, the CPU 110 first obtains a latest e-mail concerning the target supplies (S140) and analyzes the description of the obtained e-mail (S142).

Next, the CPU 110 determines whether the analyzed description contains a character string "Sent" (S144). When determining that the analyzed description contains the character string "Sent" (S144: Yes), the CPU 110 sets the Current Status=Sent (S146). Afterward, the CPU 110 terminates the second status obtainment process.

Meanwhile, when determining that the analyzed description does not contain the character string "Sent" (S144: No), the CPU 110 determines whether the analyzed description contains a character string "Received" (S148). When determining that the analyzed description contains the character string "Received" (S148: Yes), the CPU 110 sets the Current Status=Received (S150). Thereafter, the CPU 110 terminates the second status obtainment process.

Meanwhile, when determining that the analyzed description does not contain the character string "Received" (S148: No), the CPU 110 determines whether the analyzed description contains a character string "Dispatched" (S152). When determining that the analyzed description contains the character string "Dispatched" (S152: Yes), the CPU 110 sets the Current Status=Dispatched (S154). Thereafter, the CPU 110 terminates the second status obtainment process.

Meanwhile, when determining that the analyzed description does not contain the character string "Dispatched" (S152: No), the CPU 110 determines whether the analyzed description contains a character string "Delivered" (S156). When determining that the analyzed description contains the character string "Delivered" (S156: Yes), the CPU 110 sets the Current Status=Delivered (S158). Thereafter, the CPU 110 terminates the second status obtainment process.

Meanwhile, when determining that the analyzed description does not contain the character string "Delivered" (S156: No), the CPU 110 provides an error notification (S160). Thereafter, the CPU 110 terminates the second status obtainment process.

Thus, the CPU 110 obtains the Current Status in second status obtainment process, and updates the Current Status in the history information on the target supplies by overwriting it with the obtained one.

As described above, the MFP 100 of the illustrative embodiment is configured to display, on the display 160, the history information containing information generated based on the most recent order date of a selected type of supplies to be ordered, in such a manner that the selected type of supplies to be ordered is identified. Therefore, it is possible to avoid a duplicate order for the selected type of supplies to be ordered.

In addition, the MFP 100 of the illustrative embodiment is further configured to display, on the display 160, the history information containing individual information generated based on the most recent order date of each type of all the supplies that have been ordered before, in such a manner that each type of all the supplies that have been ordered before is identified. Thus, it is possible to more securely prevent a duplicate order for supplies to be ordered.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

The aforementioned illustrative embodiment has been described with the MFP 100 taken as an example of an "image processing apparatus" according to aspects of the present disclosure. However, examples of the "image processing apparatus" according to aspects of the present disclosure may include, but are not limited to, a standalone printer, a standalone image scanner, and a standalone copier.

In the aforementioned illustrative embodiment, a "controller" according to aspects of the present disclosure includes a single CPU 110. However, the "controller" according to aspects of the present disclosure may include a plurality of CPUs, may include a CPU including a plurality of cores, or may include a CPU and a dedicated circuit. Examples of the dedicated circuit may include, but are not limited to, ASICs ("ASIC" is an abbreviation for "Application Specific Integrated Circuit") and FPGAs ("FPGA" is an abbreviation for "Field Programmable Gate Array").

The following shows examples of associations between elements exemplified in the aforementioned illustrative embodiments and modifications and elements according to aspects of the present disclosure. The image processing system 1 may be an example of an "image processing system" according to aspects of the present disclosure. The MFP 100 may be an example of an "image processing apparatus" according to aspects of the present disclosure. The server 200 may be an example of an "information processing device" according to aspects of the present disclosure. The printer 130 of the MFP 100 may be an example of a "printer" of the "image processing apparatus" according to aspects of the present disclosure. The communication I/F 180 may be an example of a "communication interface" according to aspects of the present disclosure, and may be an example of a "first communication interface" according to aspects of the present disclosure. The input I/F 170 may be an example of a "user interface" according to aspects of the present disclosure. The display 160 may be an example of a "display" according to aspects of the present disclosure. The CPU 110 may be included in a "controller" according to aspects of the present disclosure, and may be included in a "first controller" according to aspects of the present disclosure. In addition, the memory 120 storing the control program 122 may be included in the "controller" according to aspects of the present disclosure, and may be included in the "first controller" according to aspects of the present disclosure. The memory 120 storing the control program 122 may be an example of a "non-transitory computer-readable medium" storing "computer-readable instructions" according to aspects of the present disclosure. The memory 120 may be an example of a "memory" according to aspects of the present disclosure. The communication I/F 220 may be an example of a "second communication interface" according to aspects of the present disclosure. The controller 210 may be an example of a "second controller" according to aspects of the present disclosure. Each of the photoconductive drums 131 for the three colors of cyan, magenta, and yellow may be an example of a "photoconductive body" for each of three colors of cyan, magenta, and yellow according to aspects of the present disclosure. The conveyor belt 133 may be an example of a "transfer body" according to aspects of the present disclosure. The warning screen 160a may be an example of a "warning screen" according to aspects of the present disclosure. The supply selection screen 163 may be an example of an "order screen" according to aspects of the present disclosure. The order quantity input screen 166 may be an example of an "order quantity input screen" according to aspects of the present disclosure. The selection of the type of supplies to be ordered via the supply selection screen 163 in S12 of FIG. 5A may be included in examples of a "display trigger" according to aspects of the present disclosure. In addition, the selection of the "View Order history (all)" item 162b via the service screen 162 may be included in the examples of the "display trigger" according to aspects of the present disclosure.

What is claimed is:

1. An image processing apparatus configured to print a color image on a sheet using cyan toner stored in a cyan cartridge, magenta toner stored in a magenta cartridge, yellow toner stored in a yellow cartridge, and black toner stored in a black cartridge, the image processing apparatus comprising:
    a communication interface;
    a user interface;
    a display;
    a memory; and
    a controller configured to:
      monitor periodically an order history for the cyan cartridge, the magenta cartridge, the yellow cartridge and the black cartridge, the monitoring including determining a shipment status of an ordered cartridge and an associated status date for the ordered cartridge, per each ordered cartridge, and whether a cartridge installed in the image processing apparatus has been replaced with an ordered cartridge and an associated replacement date, per each cartridge which is replaced and determining a remaining amount of an ordered cartridge, per each ordered cartridge;
      store the monitored order history in the memory;
      display on the display a history display item customization screen configured to receive a user input to customize a display setting for items for a reconfigurable cartridge order history screen for each respective color cartridge;
      in response to receiving the user input via the user interface, apply the customized display setting for items for the reconfigurable cartridge order history screen for each respective color cartridge;
      perform a printing process comprising:
      obtaining image data of the color image to be printed;
      generating print data from the image data for the color image;
      causing the image processing apparatus to print the color image using respective toner from a respective cartridge based on the generated print data; after printing the color image, determining a remaining amount of toner in the cyan cartridge, the magenta cartridge, the yellow cartridge, and the black cartridge;
      determining, based on the determined remaining amount of toner in each of the cyan cartridge, the magenta cartridge, the yellow cartridge, and the black cartridge, whether at least one remaining toner amount is equal to or less than a particular threshold, the at least one remaining toner amount being selected from a group consisting of a remaining amount of the cyan toner stored in the cyan cartridge, a remaining amount of magenta toner stored in the magenta cartridge, a remaining amount of yellow toner stored in the yellow cartridge, and a remaining amount of black toner stored in the black cartridge; and
      displaying a warning screen on the display in response to determining that the at least one remaining toner amount is equal to or less than the particular threshold, wherein a warning screen indicating that the remaining amount of the cyan toner stored in the cyan cartridge is equal to or less than the particular threshold is displayed on the display when it is determined that the remaining amount of the cyan toner stored in the cyan cartridge is equal to or less than the particular threshold, a warning screen indicating that the remaining amount of the magenta toner stored in the magenta cartridge is equal to or less than the particular threshold is displayed on the display when it is determined that the remaining amount of the magenta toner stored in the magenta cartridge is equal to or less than the particular threshold, a warning screen indicating that the remaining amount of the yellow toner stored in the yellow cartridge is equal to or less than the particular threshold is displayed on the display when it is determined that the remaining amount of the yellow toner stored in the yellow cartridge is equal to or less than the particular threshold, and a warning screen indicating that the remaining amount of the black toner stored in the black cartridge is equal to or less than the particular threshold is displayed on the display when it is determined that the remaining amount of the black toner stored in the black cartridge is equal to or less than the particular threshold, wherein after the warning screen has been displayed on the display, transition from the warning screen to display a cartridge selection screen, the cartridge selection screen including a selectable object for the cyan cartridge, a selectable object for the magenta cartridge, a selectable object for the yellow cartridge, and a selectable object for the black cartridge;
    perform an order process comprising:
    receiving, via the user interface, an operation to select one of the selectable objects for the cyan cartridge, the magenta cartridge, the yellow cartridge, or the black cartridge on the cartridge selection screen;
    after receiving the operation to select one of the selectable objects and before placing an order for the selected type of cartridge, performing a cartridge order history display process to display the monitored order history on the display; and
    in response to receiving an input for specifying an order quantity of the selected type of cartridge via the user interface after receiving the operation to select one of the selectable objects, placing an order for the specified quantity of the selected type of cartridge to a server via the communication interface,
    wherein when the selectable object for the cyan cartridge is selected, and an order quantity of the cyan cartridge is input, an order for the input order quantity of the cyan cartridge is placed to the server via the communication interface, when the selectable object for the magenta cartridge is selected, and an order quantity of the magenta cartridge is input, an order for the input order quantity of the magenta cartridge is placed to the server via the communication interface, when the selectable object for the yellow cartridge is selected, and an order quantity of the yellow cartridge is input, an order for the input order quantity of the yellow cartridge is placed to the server via the communication interface, and when the selectable object for the black cartridge is selected, and an order quantity of the black cartridge is input, an order for the input order quantity of the black cartridge is placed to the server via the communication interface,
    the cartridge order history display process comprising:
    in response to receiving an operation to select the selectable object for the cyan cartridge, via the cartridge selection screen, determining whether the memory stores the monitored order history for the cyan cartridge;

in response to determining that the memory does not store the monitored order history for the cyan cartridge, continuing the order process to receive an input for the specifying the order quantity of the cyan cartridge, without displaying a reconfigurable cartridge order history screen for the cyan cartridge;

in response to determining that the memory stores the monitored order history for the cyan cartridge, displaying the reconfigurable cartridge order history screen for the cyan cartridge, and an operable object for continuing the order process; and in response to receiving, via the user interface, an operation to the operable object that is included in the reconfigurable cartridge order history screen for the cyan cartridge for continuing the order process, continuing the order process to place an order for the input order quantity of the cyan cartridge to the server via the communication interface, otherwise terminating the order process, the cartridge order history display process further comprising:

in response to receiving an operation to select the selectable object for the magenta cartridge, via the cartridge selection screen, determining whether the memory stores the monitored order history for the magenta cartridge;

in response to determining that the memory does not store the monitored order history for the magenta cartridge, continuing the order process to receive an input for the specifying the order quantity of the magenta cartridge, without displaying a reconfigurable cartridge order history screen for the magenta cartridge;

in response to determining that the memory stores the monitored order history for the magenta cartridge, displaying the reconfigurable cartridge order history screen for the magenta cartridge, and an operable object for continuing the order process; and in response to receiving, via the user interface, an operation to the operable object that is included in the reconfigurable cartridge order history screen for the magenta cartridge for continuing the order process, continuing the order process to place an order for the input order quantity of the magenta cartridge to the server via the communication interface, otherwise terminating the order process, the cartridge order history display process further comprising:

in response to receiving an operation to select the selectable object for the yellow cartridge, via the cartridge selection screen, determining whether the memory stores the monitored order history for the yellow cartridge;

in response to determining that the memory does not store the monitored order history for the yellow cartridge, continuing the order process to receive an input for the specifying the order quantity of the yellow cartridge, without displaying a reconfigurable cartridge order history screen for the yellow cartridge;

in response to determining that the memory stores the monitored order history information for the yellow cartridge displaying the reconfigurable cartridge order history screen for the yellow cartridge, and an operable object for continuing the order process; and in response to receiving, via the user interface, an operation to the operable object that is included in the reconfigurable cartridge order history screen for the yellow cartridge for continuing the order process, continuing the order process to place an order for the input order quantity of the yellow cartridge to the server via the communication interface, otherwise terminating the order process, and the cartridge order history display process further comprising:

in response to receiving an operation to select the selectable object for the black cartridge, via the cartridge selection screen, determining whether the memory stores the monitored order history for the black cartridge;

in response to determining that the memory does not store the monitored order history for the black cartridge, continuing the order process to receive an input for the specifying the order quantity of the black cartridge, without displaying a reconfigurable cartridge order history screen for the black cartridge;

in response to determining that the memory stores the monitored order history for the black cartridge displaying the reconfigurable cartridge order history screen for the black cartridge, and an operable object for continuing the order process; and in response to receiving, via the user interface, an operation to the operable object that is included in the reconfigurable cartridge order history screen for the black cartridge for continuing the order process, continuing the order process to place an order for the input order quantity of the black cartridge to the server via the communication interface, otherwise terminating the order process.

2. The image processing apparatus according to claim 1, further comprising:

a replaceable photoconductive body for each toner color, the image processing apparatus being further configured to perform electrophotographic color printing by supplying toner of each toner color to an electrostatic latent image formed on the photoconductive body for each toner color, forming a developer image on the photoconductive body for each toner color, and transferring the developer image of each toner color onto the sheet, and wherein the controller is further configured to:
monitor periodically an order history for the replaceable photoconductive body for each toner color;
store the monitored order history for the replaceable photoconductive body for each toner color in the memory;
display, on the display, information on a replacement time when each photoconductive body should be replaced; and
when receiving, via the user interface, an ordering operation to order a photoconductive body for a specific toner color selected, place an order for the selected photoconductive body for the specific toner color to the server via the communication interface after a reconfigurable cartridge order history screen for is displayed for the photoconductive body for the specific toner color based on the monitored order history for the replaceable photoconductive body for the specific toner color stored in memory and the ordering operation is subsequently received.

3. The image processing apparatus according to claim 2, further comprising a replaceable transfer body, the image processing apparatus being further configured to transfer the developer image of each toner color onto the sheet using the transfer body, and
wherein the controller is further configured to:
  monitor periodically order history for the replaceable transfer body;
  store the monitored order history for the replaceable transfer body in the memory;
  display, on the display, information on a replacement time when the transfer body should be replaced; and
  when receiving, via the user interface, an ordering operation to order a transfer body selected, place an order for the selected transfer body to the server via the communication interface after a reconfigurable cartridge order history screen is displayed for the transfer body based on the monitored order history stored for the replaceable transfer body in memory and the ordering operation is subsequently received.

4. The image processing apparatus according to claim 3, further comprising a replaceable waste toner box, the image processing apparatus being further configured to remove and collect adhering substances on the transfer body into the waste toner box, and
wherein the controller is further configured to:
  monitor order history for the replaceable waster toner box;
  store the monitored order history for the replaceable waster toner box in the memory;
  display, on the display, information on a replacement time when the waste toner box should be replaced; and
  when receiving, via the user interface, an ordering operation to order a waste toner box selected, place an order for the selected toner box to the server via the communication interface after a reconfigurable cartridge order history screen is displayed on the waste toner box based on the monitored order history stored for the replaceable waster toner box in the memory and the ordering operation is subsequently received.

5. The image processing apparatus according to claim 4, wherein the monitored order history indicates an individual order history of each type of supplies ordered and contains individual information generated based on a most recent order date of each type of supplies ordered, and
wherein the controller is further configured to, when receiving a specific operation via the user interface, read from the memory the monitored order history on the supplies ordered, and display the read order history on the display in such a manner that each type of the supplies ordered is identified, wherein the supplies ordered is selected from a group consisting of the cyan cartridge, the magenta cartridge, the yellow cartridge, and the black cartridge, the replaceable photoconductive body for each toner color, the replaceable transfer body and the replaceable waster toner box.

6. The image processing apparatus according to claim 1, wherein a name of the type of toner cartridge is displayed side by side with the monitored order history generated based on a most recent order date of the type of toner cartridge.

7. The image processing apparatus according to claim 1, wherein the controller is further configured to:
  after the cartridge history display process and, before ordering a particular type of toner cartridge, when receiving, a selection operation to reselect the particular type of toner cartridge, display an order quantity input screen for the particular type of toner cartridge without again displaying the monitored order history on the particular type of toner cartridge.

8. The image processing apparatus according to claim 1, wherein history information includes a plurality of the items displayable on the display, and
wherein the customized display setting includes displaying or not displaying each of the plurality of the items.

9. The image processing apparatus according to claim 1, wherein in the monitoring of the shipment status, the controller is further configured to:
  determine an ordering status of a specific type of toner cartridge ordered, from among a plurality of predefined ordering statuses.

10. The image processing apparatus according to claim 9, wherein the controller is further configured to determine the ordering status of the specific type of toner cartridge ordered, based on information contained in an e-mail communicated regarding the specific type of toner cartridge.

11. The image processing apparatus according to claim 1, wherein the controller is further configured to:
  when receiving, via the user interface, a first operation to display the monitored order history on a plurality of types of toner cartridges ordered, display the monitored order history on the plurality of types of toner cartridges in a first display mode; and
  when receiving, via the user interface, a second operation to select a single type of toner cartridge to be ordered from among the orderable types of toner cartridges displayed on the cartridge selection screen, display the monitored order history on the selected single type of toner cartridge in a second display mode different from the first display mode.

12. The image processing apparatus according to claim 11,
wherein each monitored order history contains a plurality of the items, and
wherein the controller is further configured to:
  in the first display mode, display one or more items among the plurality of the items contained in the monitored order history on each of the plurality of types of toner cartridges ordered, where the one or more items are set to be displayed; and
  in the second display mode, display all of the plurality of the items contained in the monitored order history on the selected single type of toner cartridge to be ordered.

13. The image processing apparatus according to claim 11,
wherein the controller is further configured to place an order for the selected single type of toner cartridge, when receiving, via the user interface, an ordering operation to order the selected single type of toner cartridge while the monitored order history on the selected single type of toner cartridge is being displayed in the second display mode.

14. The image processing apparatus according to claim 11,
wherein the monitored order history on each of the plurality of types of toner cartridges ordered contains a plurality of the items displayable in the first display mode, and wherein the customized display setting includes display or not display each of the plurality of items.

15. The image processing apparatus according to claim 1, wherein the controller comprises:
   a processor; and
   a non-transitory computer-readable medium storing computer-readable instructions configured to, when executed by the processor, cause the controller to be configured according to claim 1.

16. An image processing system comprising:
an image processing apparatus configured to print a color image on a sheet using cyan toner stored in a cyan cartridge, magenta toner stored in a magenta cartridge, yellow toner stored in a yellow cartridge, and black toner stored in a black cartridge; and
a server communicably connected with the image processing apparatus,
wherein the image processing apparatus comprises:
   a first communication interface;
   a user interface;
   a display;
   a memory; and
   a first controller configured to:
      monitor periodically an order history for the cyan cartridge, the magenta cartridge, the yellow cartridge and the black cartridge, the monitoring including determining a shipment status of an ordered cartridge and an associated status date for the ordered cartridge, per each ordered cartridge and whether a cartridge installed in the image processing apparatus has been replaced with an ordered cartridge and an associated replacement date, per each cartridge which is replaced and determining a remaining amount of an ordered cartridge, per each ordered cartridge;
      store the monitored order history in the memory;
      display on the display a history display item customization screen configured to receive a user input to customizes a display setting for items for a reconfigurable cartridge order history screen for each respective color cartridge;
      in response to receiving the customized display settings via the user interface, apply the customized display setting for items for the reconfigurable cartridge order history screen for each respective color cartridge;
      perform a printing process comprising:
         obtaining image data of the color image to be printed;
         generating print data from the image data for the color image;
         causing the image processing apparatus to print the color image using respective toner from a respective cartridge based on the generated print data;
         after printing the color image, determining a remaining amount of toner in the cyan cartridge, the magenta cartridge, the yellow cartridge, and the black cartridge;
         determining, based on the determined remaining amount of toner in each of the cyan cartridge, the magenta cartridge, the yellow cartridge, and the black cartridge, whether at least one remaining toner amount is equal to or less than a particular threshold, the at least one remaining toner amount being selected from a group consisting of a remaining amount of the cyan toner stored in the cyan cartridge, a remaining amount of magenta toner stored in the magenta cartridge, a remaining amount of yellow toner stored in the yellow cartridge, and a remaining amount of black toner stored in the black cartridge and
         displaying a warning screen on the display in response to determining that the at least one remaining toner amount is equal to or less than the particular threshold, wherein a warning screen indicating that the remaining amount of the cyan toner stored in the cyan cartridge is equal to or less than the particular threshold is displayed on the display when it is determined that the remaining amount of the cyan toner stored in the cyan cartridge is equal to or less than the particular threshold, a warning screen indicating that the remaining amount of the magenta toner stored in the magenta cartridge is equal to or less than the particular threshold is displayed on the display when it is determined that the remaining amount of the magenta toner stored in the magenta cartridge is equal to or less than the particular threshold, a warning screen indicating that the remaining amount of the yellow toner stored in the yellow cartridge is equal to or less than the particular threshold is displayed on the display when it is determined that the remaining amount of the yellow toner stored in the yellow cartridge is equal to or less than the particular threshold, and a warning screen indicating that the remaining amount of the black toner stored in the black cartridge is equal to or less than the particular threshold is displayed on the display when it is determined that the remaining amount of the black toner stored in the black cartridge is equal to or less than the particular threshold, wherein after the warning screen has been displayed on the display, transition from the warning screen to display a cartridge selection screen, the cartridge selection screen including a selectable object for the cyan cartridge, a selectable object for the magenta cartridge, a selectable object for the yellow cartridge, and a selectable object for the black cartridge;
      perform an order process comprising:
         receiving, via the user interface, an operation to select one of the selectable objects for the cyan cartridge, the magenta cartridge, the yellow cartridge, or the black cartridge on the cartridge selection screen;
         after receiving the operation to select one of the selectable objects and before placing an order for the selected type of cartridge, performing a cartridge order history display process to display the monitored order history on the display; and
         in response to receiving, an input for specifying an order quantity of the selected type of cartridge via the user interface, after receiving the operation to select one of the selectable objects, placing an order for the specified quantity of the selected type of cartridge to the server via the first communication interface,
      wherein when the selectable object for the cyan cartridge is selected, and an order quantity of the cyan cartridge is input, an order for the input order quantity of the cyan cartridge is placed to the server via the first communication interface, when the selectable object for the magenta cartridge is selected, and an order quantity of the magenta cartridge is input, an order for the input order quantity of the magenta cartridge is placed to the server via the first communication interface, when the selectable object for the yellow cartridge is selected, and an order quantity of the yellow cartridge is input, an order for the input order quantity of the yellow cartridge is placed to the server via the first communication interface, and when the selectable object for the black cartridge is selected, and an order quantity of the black cartridge is input, an order for the input order quantity of the black cartridge is placed to the server via the first communication interface, the cartridge order history display process comprising:

in response to receiving an operation to select the selectable object for the cyan cartridge, via the cartridge selection screen, determining whether the memory stores the monitored order history for the cyan cartridge;

in response to determining that the memory does not store the monitored order history for the cyan cartridge, continuing the order process to receive an input for the specifying the order quantity of the cyan cartridge, without displaying a reconfigurable cartridge order history screen for the cyan cartridge;

in response to determining that the memory stores the monitored order history for the cyan cartridge displaying the reconfigurable cartridge order history screen for the cyan cartridge, and an operable object for continuing the order process; and in response to receiving, via the user interface, an operation to the operable object that is included in the reconfigurable cartridge order history screen for the cyan cartridge for continuing the order process, continuing the order process to place an order for the input order quantity of the cyan cartridge to the server via the first communication interface, otherwise terminating the order process, the cartridge order history display process further comprising:

in response to receiving an operation to select the selectable object for the magenta cartridge, via the cartridge selection screen, determining whether the memory stores the monitored order history for the magenta cartridge;

in response to determining that the memory does not store the monitored order history for the magenta cartridge, continuing the order process to receive an input for the specifying the order quantity of the magenta cartridge, without displaying a reconfigurable cartridge order history screen for the magenta cartridge;

in response to determining that the memory stores the monitored order history for the magenta cartridge displaying the reconfigurable cartridge order history screen for the magenta cartridge, and an operable object for continuing the order process; and in response to receiving, via the user interface, an operation to the operable object that is included in the reconfigurable cartridge order history screen for the magenta cartridge for continuing the order process, continuing the order process to place an order for the input order quantity of the magenta cartridge to the server via the first communication interface, otherwise terminating the order process, the cartridge order history display process further comprising:

in response to receiving an operation to select the selectable object for the yellow cartridge, via the cartridge selection screen, determining whether the memory stores the monitored order history for the yellow cartridge;

in response to determining that the memory does not store the monitored order history information for the yellow cartridge, continuing the order process to receive an input for the specifying the order quantity of the yellow cartridge, without displaying a reconfigurable cartridge order history screen for the yellow cartridge;

in response to determining that the memory stores the monitored order history for the yellow cartridge displaying the reconfigurable cartridge order history screen for the yellow cartridge, and an operable object for continuing the order process; and in response to receiving, via the user interface, an operation to the operable object that is included in the reconfigurable cartridge order history screen for the yellow cartridge for continuing the order process, continuing the order process to place an order for the input order quantity of the yellow cartridge to the server via the first communication interface, otherwise terminating the order process, and the cartridge order history display process further comprising:

in response to receiving an operation to select the selectable object for the black cartridge, Via-via the cartridge selection screen, determining whether the memory stores the monitored order history for the black cartridge;

in response to determining that the memory does not store the monitored order history for the black cartridge, continuing the order process to receive an input for the specifying the order quantity of the black cartridge, without displaying a reconfigurable cartridge order history screen for the black cartridge;

in response to determining that the memory stores the monitored order history for the black cartridge displaying the reconfigurable cartridge order history screen for the black cartridge, and an operable object for continuing the order process; and in response to receiving, via the user interface, an operation to the operable object that is included in the reconfigurable cartridge order history screen for the black cartridge for continuing the order process, continuing the order process to place an order for the input order quantity of the black cartridge to the server via the first communication interface, otherwise terminating the order process, and wherein the server comprises:

a second communication interface; and a second controller configured to receive information regarding a type of toner cartridge ordered, from the image processing apparatus via the second communication interface.

17. A method implementable on a controller of an image processing apparatus, the image processing apparatus being configured to print a color image on a sheet using cyan toner stored in a cyan cartridge, magenta toner stored in a magenta cartridge, yellow toner stored in a yellow cartridge, and black toner stored in a black cartridge, the image processing apparatus comprising a communication interface, a user interface, a display, and a memory, the method comprising:

monitoring periodically an order history for the cyan cartridge, the magenta cartridge, the yellow cartridge and the black cartridge, the monitoring including determining a shipment status of an ordered cartridge and an associated status date for the ordered cartridge for each ordered cartridge, and whether a cartridge installed in the image processing device has been replaced with an ordered cartridge and an associated replacement date, per each cartridge which is replaced and determining a remaining amount of an ordered cartridge, per each ordered cartridge;

storing the monitored order history in the memory;

displaying on the display a history display item customization screen configured to receive a user input to customizes a display setting for items for a reconfigurable cartridge order history screen for each respective color cartridge;

applying the customized display setting for the items for the reconfigurable cartridge order history screen for each respective color cartridge;

performing a printing process comprising:

obtaining image data of the color image to be printed;

generating print data from the image data for the color image;

causing the image processing apparatus to print the color image using respective toner from a respective cartridge based on the generated print data;

after printing the color image, determining a remaining amount of toner in the cyan cartridge, the magenta cartridge, the yellow cartridge, and the black cartridge;

determining, based on the determined remaining amount of toner in each of the cyan cartridge, the magenta cartridge, the yellow cartridge, and the black cartridge, that at least one remaining toner amount is equal to or less than a particular threshold, the at least one remaining toner amount being selected from a group consisting of a remaining amount of the cyan toner stored in the cyan cartridge, a remaining amount of magenta toner stored in the magenta cartridge, a remaining amount of yellow toner stored in the yellow cartridge, and a remaining amount of black toner stored in the black cartridge; and displaying a warning screen on the display in response to determining that the at least one remaining toner amount is equal to or less than the particular threshold, a warning screen indicating that the remaining amount of the yellow toner stored in the yellow cartridge is equal to or less than the particular threshold is displayed on the display when it is determined that the remaining amount of the yellow toner stored in the yellow cartridge is equal to or less than the particular threshold, and a warning screen indicating that the remaining amount of the black toner stored in the black cartridge is equal to or less than the particular threshold is displayed on the display when it is determined that the remaining amount of the black toner stored in the black cartridge is equal to or less than the particular threshold, wherein after the warning screen has been displayed on the display, transitioning from the warning screen to display a cartridge selection screen, the cartridge selection screen including a selectable object for the cyan cartridge, a selectable object for the magenta cartridge, a selectable object for the yellow cartridge, and a selectable object for the black cartridge;

performing an order process, the order process comprising:

receiving, via the user interface, an operation to select one of the selectable objects for the cyan cartridge, the magenta cartridge, the yellow cartridge, or the black cartridge on the cartridge selection screen;

after receiving the operation to select one of the selectable objects and before placing an order for the selected type of cartridge, performing a cartridge order history display process to display the monitored order history on the display;

after receiving the operation to select one of the selectable objects, receiving an input for specifying an order quantity of the selected type of cartridge via the user interface after receiving the operation to select one of the selectable objects;

placing an order for the specified quantity of the selected type of cartridge to a server via the communication interface, wherein when the selectable object for the cyan cartridge is selected, and an order quantity of the cyan cartridge is input, an order for the input order quantity of the cyan cartridge is placed to the server via the communication interface, when the selectable object for the magenta cartridge is selected, and an order quantity of the magenta cartridge is input, an order for the input order quantity of the magenta cartridge is placed to the server via the communication interface, when the selectable object for the yellow cartridge is selected, and an order quantity of the yellow cartridge is input, an order for the input order quantity of the yellow cartridge is placed to the server via the communication interface, and when the selectable object for the black cartridge is selected, and an order quantity of the black cartridge is input, an order for the input order quantity of the black cartridge is placed to the server via the communication interface, and performing the cartridge order history display process comprising:

depending on whether the memory stores the monitored order history for the cyan cartridge, performing a corresponding one of selectable processes comprising:

when the memory does not store the monitored order history for the cyan cartridge, continuing the order process to receive an input for the specifying the order quantity of the cyan cartridge, without displaying a reconfigurable cartridge order history screen for the cyan cartridge; and when the memory stores the monitored order history displaying the reconfigurable cartridge order history screen for the cyan cartridge, and an operable object for continuing the order process, receiving, via the user interface, an operation to the operable object that is included in the reconfigurable cartridge order history screen for the cyan cartridge for continuing the order process, and continuing the order process to place an order for the input order quantity of the cyan cartridge to the server via the communication interface, otherwise terminating the order process, the cartridge order history display process further comprising:

depending on whether the memory stores the monitored order history for the magenta cartridge, performing a corresponding one of selectable processes comprising:

when the memory does not store the monitored order history for the cyan cartridge, continuing the order process to receive an input for the specifying the order quantity of the magenta cartridge, without displaying a reconfigurable cartridge order history screen for the magenta cartridge; and when the memory stores the monitored order history for the magenta cartridge, displaying the reconfigurable cartridge order history screen for the magenta cartridge, and an operable object for continuing the order process, receiving, via the user interface, an operation to the operable object that is included in the reconfigurable cartridge order history screen for the magenta cartridge for continuing the order process, and continuing the order process to place an order for the input order quantity of the magenta cartridge to the server via the communication interface, otherwise terminating the order process, the cartridge order history display process further comprising:

depending on whether the memory stores the monitored order history for the yellow cartridge, performing a corresponding one of selectable processes comprising:

when the memory does not store the monitored order history for the yellow cartridge, continuing the order process to receive an input for the specifying the order quantity of the yellow cartridge, without displaying a reconfigurable cartridge order history screen for the yellow cartridge; and when the memory stores the monitored order history for the yellow cartridge displaying the reconfigurable cartridge order history screen for the yellow cartridge, and an operable object for continuing the order process, receiving, via the user interface, an operation to the operable object that is included in the reconfigurable cartridge order history screen for the yellow cartridge for continuing the order process, and continuing the order process to place an order for the input order quantity of the yellow cartridge to the server via the communication interface, otherwise terminating the order process, and the cartridge order history display process further comprising:

depending on whether the memory stores the monitored order history for the black cartridge, performing a corresponding one of selectable processes comprising:

when the memory does not store the monitored order history for the black cartridge, continuing the order process to receive an input for the specifying the order quantity of the black cartridge, without displaying a reconfigurable cartridge order history screen for the black cartridge; and when the memory stores the monitored order history for the black cartridge displaying the reconfigurable cartridge order history screen for the black cartridge, and an operable object for continuing the order process;

receiving, via the user interface, an operation to the operable object that is included in the reconfigurable cartridge order history screen for the black cartridge for continuing the order process, and continuing the order process to place an order for the input order quantity of the black cartridge to the server via the communication interface, otherwise terminating the order process.

* * * * *